(12) United States Patent
Chapman et al.

(10) Patent No.: US 7,917,495 B1
(45) Date of Patent: Mar. 29, 2011

(54) SYSTEM AND METHOD FOR PROCESSING QUERY REQUESTS IN A DATABASE SYSTEM

(75) Inventors: Richard K. Chapman, Boca Raton, FL (US); David A. Bayliss, Delray Beach, FL (US); Gavin C. Halliday, Royston (GB); Nigel G. Hicks, London (GB); Ole D. Poulsen, Bend, OR (US); Jacob Cobbett-Smith, London (GB)

(73) Assignee: Seisint, Inc., Boca Raton, FL (US)

( * ) Notice: Subject to any disclaimer, the term of this patent is extended or adjusted under 35 U.S.C. 154(b) by 387 days.

(21) Appl. No.: 10/866,204

(22) Filed: Jun. 11, 2004

(51) Int. Cl.
*G06F 7/00* (2006.01)
*G06F 17/30* (2006.01)

(52) U.S. Cl. ........................................ 707/713; 707/718
(58) Field of Classification Search .................. 707/713, 707/718
See application file for complete search history.

(56) References Cited

U.S. PATENT DOCUMENTS

| | | | |
|---|---|---|---|
| 4,543,630 A | 9/1985 | Neches | |
| 5,301,333 A | 4/1994 | Lee | |
| 5,349,682 A | 9/1994 | Rosenberry | |
| 5,418,937 A | 5/1995 | Inoue | |
| 5,437,032 A | 7/1995 | Wolf et al. | |
| 5,504,886 A | 4/1996 | Chang et al. | |
| 5,515,531 A | 5/1996 | Fujiwara et al. | |
| 5,551,027 A | 8/1996 | Choy et al. | |
| 5,675,742 A | 10/1997 | Jain et al. | |
| 5,717,911 A * | 2/1998 | Madrid et al. ..................... | 707/2 |
| 5,752,031 A | 5/1998 | Cutler et al. | |
| 5,857,180 A | 1/1999 | Hallmark et al. | |
| 6,038,563 A | 3/2000 | Bapat et al. | |
| 6,092,062 A * | 7/2000 | Lohman et al. ..................... | 707/2 |
| 6,110,228 A * | 8/2000 | Albright et al. ............... | 717/178 |
| 6,144,992 A | 11/2000 | Turpin et al. | |
| 6,351,742 B1 | 2/2002 | Agarwal et al. | |
| 6,438,537 B1 | 8/2002 | Netz et al. | |
| 6,438,562 B1 | 8/2002 | Gupta et al. | |
| 6,449,356 B1 | 9/2002 | Dezonno | |
| 6,505,205 B1 | 1/2003 | Kothuri et al. | |

(Continued)

OTHER PUBLICATIONS

System and Method for Pre-Compiling a Query and Pre-Keying a Database System, by Richard K. Chapman, et al., U.S. Appl. No. 10/866,270, Pending, 79 pages, Jun. 11, 2004.

(Continued)

*Primary Examiner* — John R Cottingham
*Assistant Examiner* — Mariela D Reyes
(74) *Attorney, Agent, or Firm* — Finnegan, Henderson, Farabow, Garrett & Dunner, LLP

(57) ABSTRACT

In certain embodiments, a database system for processing a query request comprises at least one master node operable to store a precompiled query that is capable of resolving a query request received by the database system. The at least on master node is further operable to receive a query request comprising one or more parameters and associated with the precompiled query, and to communicate a request to perform one or more activities associated with the precompiled query. The system further comprises a plurality of slave nodes coupled to the at least one master node, each of the slave nodes operable to store one or more key parts each comprising data capable of resolving a portion of the precompiled query. At least one of the slave nodes is operable to receive the request communicated by the at least one master node and to process the request communicated by the at least one master node.

30 Claims, 7 Drawing Sheets

U.S. PATENT DOCUMENTS

| | | | |
|---|---|---|---|
| 6,546,403 | B1 | 4/2003 | Carlson, Jr. et al. |
| 6,694,337 | B1 | 2/2004 | King et al. |
| 6,886,046 | B2 | 4/2005 | Stutz et al. |
| 6,993,774 | B1 | 1/2006 | Glass |
| 7,007,070 | B1 | 2/2006 | Hickman |
| 7,054,910 | B1 | 5/2006 | Nordin et al. |
| 7,158,975 | B2 | 1/2007 | Mazzagatti |
| 2001/0053957 | A1* | 12/2001 | Blair et al. ............. 702/19 |
| 2001/0055311 | A1 | 12/2001 | Trachewsky et al. |
| 2002/0065884 | A1 | 5/2002 | Donoho et al. |
| 2002/0138582 | A1 | 9/2002 | Chandra et al. |
| 2002/0143755 | A1 | 10/2002 | Wynblatt et al. |
| 2002/0152188 | A1 | 10/2002 | Crus et al. |
| 2002/0184314 | A1 | 12/2002 | Riise |
| 2003/0018645 | A1 | 1/2003 | Kong |
| 2003/0069923 | A1 | 4/2003 | Peart |
| 2003/0078858 | A1 | 4/2003 | Angelopoulos et al. |
| 2003/0200282 | A1 | 10/2003 | Arnold et al. |
| 2003/0220941 | A1 | 11/2003 | Arnold et al. |
| 2004/0088294 | A1 | 5/2004 | Lerhaupt |
| 2004/0098370 | A1 | 5/2004 | Garland et al. |
| 2004/0098390 | A1 | 5/2004 | Bayliss et al. |
| 2004/0143644 | A1 | 7/2004 | Berton et al. |
| 2004/0162822 | A1* | 8/2004 | Papanyan et al. ............. 707/4 |
| 2004/0204988 | A1 | 10/2004 | Willers et al. |
| 2004/0260685 | A1* | 12/2004 | Pfleiger et al. ............. 707/3 |
| 2004/0267719 | A1 | 12/2004 | Doherty et al. |
| 2005/0187977 | A1 | 8/2005 | Frost |

OTHER PUBLICATIONS

System and Method for Processing a Request to Perform an Activity Associated with a Precompiled Query, by Richard K. Chapman, et al., U.S. Appl. No. 10/866,565, Pending, 123 pages, Jun. 11, 2004.

System and Method for Returning Results of a Query from One or More Slave Nodes to One or More Master Nodes of a Database System, by Richard K. Chapman, et al., U.S. Appl. No. 10/866,456, Pending, 120 pages, Jun. 11, 2004.

System and Method for Enhancing System Reliability using Multiple Channels and Multicast, by Richard K. Chapman, et al., U.S. Appl. No. 10/866,604, Pending, 79 pages, Jun. 11, 2004.

System and Method for using Activity Identifications in a Database System, by Richard K. Chapman, et al., U.S. Appl. No. 10/865,954, Pending, 79 pages, Jun. 11, 2004.

System and Method for Dynamically Creating Keys in a Database System, by Richard K. Chapman, et al., U.S. Appl. No. 10/866,616, Pending, 67 pages, Jun. 11, 2004.

System and Method for Distributing Data in a Parallel Processing System, by Richard K. Chapman, et al., U.S. Appl. No. 10/866,620, Pending, 79 pages, Jun. 11, 2004.

System and Method for Managing Throughout in the Processing of Query Requests in a Database System, by Richard K. Chapman, et al., U.S. Appl. No. 10/866,394, Pending, 122 pages, Jun. 11, 2004.

Oracle7™ Server Distributed Systems, vol. II: Replicated Data, Release 7.3, Feb. 1996, Oracle®.

Liu, Ling, "Query Routing in Large-scale Digital Library Systems", Data Engineering, 1999 Proceedings, 15th International conference on Sydney, NSW, Australia, Mar. 23-26, 1999, Los Alamitos, CA, USA, IEEE Computer Society, Mar. 23, 1999, pp. 154-163.

Bonnet et al., "Query Processing in a Device Database System", Cornell University, Technical Report: TR99-1775, Oct. 1999, 26 pages.

Avi Kavas et al., Using Multicast to Pre-Load Jobs on the ParPar Cluster, Feb. 2001, Parallel Computing, vol. 27, Issue 3, pp. 315-327.

* cited by examiner

200

| | FIRST | LAST | ADDRESS | FILE NUMBER |
|---|---|---|---|---|
| | 202 | 204 | 206 | 208 |
| 224A | AARON | AASKEY | 456 | 1 |
| | AARON | BAKER | 1795 | 2 |
| | ⋮ | ⋮ | ⋮ | ⋮ |
| | CHAD | THOMAS | 321 | 16,729 |

| | FIRST | LAST | ADDRESS | FILE NUMBER |
|---|---|---|---|---|
| 224B | CHAD | TOMAS | 149 | 16,730 |
| | CHAD | TUPPER | 6371 | 16,731 |
| | ⋮ | ⋮ | ⋮ | ⋮ |
| | CONNOR | McCONNELL | 1142 | 80,542 |

| | FIRST | LAST | ADDRESS | FILE NUMBER |
|---|---|---|---|---|
| 224N | YEN | LEE | 9234 | 1,000,052 |
| | YEN | WEI | 514 | 1,000,053 |
| | ⋮ | ⋮ | ⋮ | ⋮ |
| | ZACK | ZYMOL | 2947 | 1,495,751 |

*FIG. 4*

| | FIRST | LAST | ADDRESS | NODE |
|---|---|---|---|---|
| | 302 | 304 | 306 | 308 |
| 324 | CHAD | THOMAS | 321 | $44_1$ |
| | CONNOR | McCONNELL | 1142 | $44_2$ |
| | ⋮ | ⋮ | ⋮ | ⋮ |
| | ZACK | ZYMOL | 2947 | $44_N$ |

*FIG. 5*

SYSTEM AND METHOD FOR PROCESSING QUERY REQUESTS IN A DATABASE SYSTEM

TECHNICAL FIELD OF THE INVENTION

This invention relates in general to computing systems, and more particularly to a system and method for processing query requests in a database system.

BACKGROUND

Conventional relational database systems are often capable of storing, organizing, and/or processing large amounts of data. As an example, relational database systems may be capable of storing, organizing, and/or processing many millions or billions of records. In these systems, data organization is vital to the processing efficiency of the database system. Data organization within the relational database system is particularly important in relational database systems that execute relatively complex queries and other commands involving relatively large amounts of data.

In a typical relational database system, relationships are used to breakdown the data into simpler structures for storage in one or more data-storage devices. As a result, related information may be stored and distributed over multiple data-storage devices. In most cases, before a relational database system can process a query, the relational database system must redistribute the data so that it may be processed and/or correlated according to the received query.

SUMMARY OF EXAMPLE EMBODIMENTS

According to the present invention, certain disadvantages and problems associated with previous techniques for processing query requests in a database system may be reduced or eliminated.

In certain embodiments, a database system for processing a query request comprises at least one master node operable to store a precompiled query that is capable of resolving a query request received by the database system. The at least one master node is further operable to receive a query request comprising one or more parameters and associated with the precompiled query, and to communicate a request to perform one or more activities associated with the precompiled query. The system further comprises a plurality of slave nodes coupled to the at least one master node, each of the slave nodes operable to store one or more key parts each comprising data capable of resolving a portion of the precompiled query. At least one of the slave nodes is operable to receive the request communicated by the at least one master node and to process the request communicated by the at least one master node.

In certain other embodiments, a database system comprises one or more master nodes and a plurality of slave nodes coupled to the one or more master nodes. In certain embodiments, a method processing a query request on the database system comprises receiving a query request comprising one or more parameters and associated with a precompiled query. The precompiled query is stored on at least one master node of the database system and is operable to resolve a query request received by the database system. The method further includes communicating from the at least one master node a request to perform one or more activities associated with the precompiled query. The method further includes receiving the request to perform the one or more activities at one or more of the plurality of slave nodes, each of the plurality of slave nodes operable to store one or more key parts each comprising data capable of resolving a portion of the precompiled query. The method further includes processing the request communicated by the at least one master node at the one or more slave nodes.

Various embodiments may be capable of improving the processing efficiency of a database system. Certain embodiments may be capable of processing query requests submitted to the database system using one or more precompiled queries. In certain embodiments, one or more activities for resolving at least a portion of a query request may performed by one or more slave nodes having access to relevant data for resolving that portion of the query request in a databases system, which may increase the processing efficiency of the database system.

In certain embodiments, the present invention may reduce or eliminate the possibility that more than one slave node will handle a request to perform an activity associated with a precompiled query communicated by the master node. Certain embodiments of the present invention may be capable of managing throughput in the processing on the database system of query requests received from one or more clients. In certain embodiments, prioritizing requests that are communicated to one or more slave nodes by master nodes may help the database system to increase or maximize throughput for query requests of higher importance or priority. In certain embodiments, the present invention may enable one or more master nodes of the database system to decrease or minimize the amount of time that the master nodes are idle waiting for one or more slave nodes to send results obtained for requests sent by the master nodes to the slave nodes.

Certain embodiments of the present invention may provide some, all, or none of the above technical advantages. Certain embodiments may provide one or more other technical advantages, one or more of which may be readily apparent to those skilled in the art from the figures, descriptions, and claims included herein.

BRIEF DESCRIPTION OF THE DRAWINGS

For a more complete understanding of the present invention and features and advantages thereof, reference is now made to the following description, taken in conjunction with the accompanying drawings, in which:

FIG. 3 illustrates an example query execution graph associated with an example precompiled query;

FIG. 4 illustrates an example sorted table that includes a plurality of key parts;

FIG. 5 illustrates an example top level key associated with a sorted table;

DESCRIPTION OF EXAMPLE EMBODIMENTS

One aspect of the present disclosure provides a system and method for processing query requests within a parallel-processing system. In particular, this disclosure provides an exemplary parallel-processing database system capable of processing query requests. It should be appreciated that the certain concepts described within this disclosure may apply or be implemented within any other parallel-processing system without departing from the scope of the present disclosure. Moreover, particular examples specified throughout this document are intended for exemplary purposes only, and are not intended to limit the scope of the present disclosure.

Figure 1:
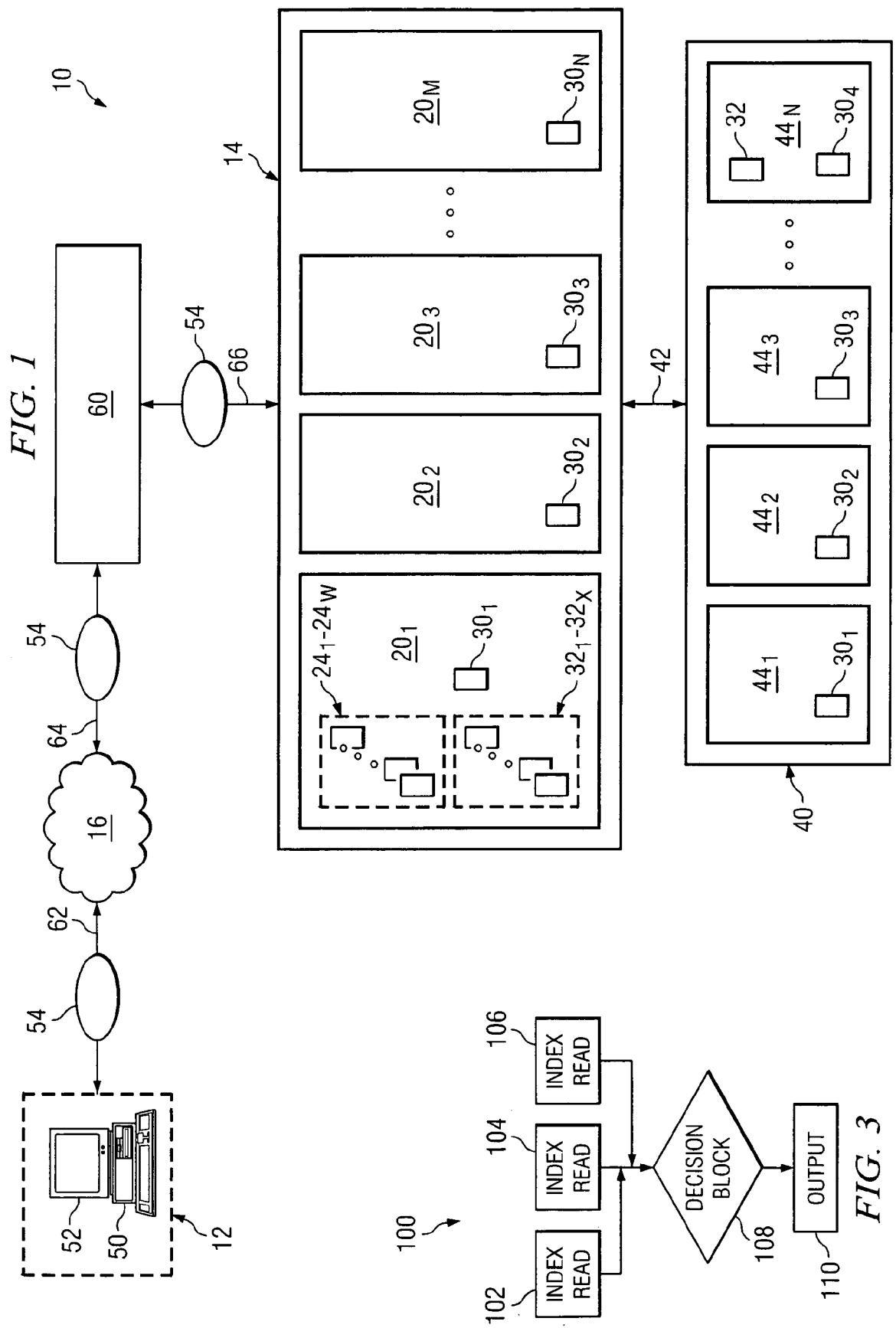
FIG. 1 illustrates an example system for processing query requests according to one embodiment of the present invention.

FIG. 1 illustrates an example system 10 for processing query requests according to one embodiment of the present invention. FIG. 1 illustrates just one example embodiment of system 10. It should be appreciated that other embodiments of system 10 may be used without departing from the scope of the present invention. In certain embodiments, system 10 includes one or more clients 12 coupled to a first database system 14 via a network 16. In general, clients 12 submit one or more query requests to database system 14, and database system 14 processes the query requests using one or more precompiled queries distributed through one or more nodes of database system 14.

As used throughout this document, the term "precompiled query" refers to a query that has been deployed on a database system (e.g., database system 14) in advance of a user executing such query (i.e., by submitting a query request) on such database system. Additionally, as used throughout this document, the term "couple" and/or "coupled" refers to any direct or indirect communication between two or more elements, whether or not those elements are in physical contact with one another.

First database system 14 of system 10 is capable of performing one or more desired computing and/or communicating functions. For example, first database system 14 may be capable of storing, organizing, sorting, processing, correlating, and/or communicating one or more keys and/or indices associated with one or more data files. In addition, first database system 14 may be capable of, for example, storing, deploying, processing, and/or executing one or more precompiled queries, and pre-keying data associated with the precompiled queries. Moreover, first database system 14 is operable to execute one or more precompiled queries upon receiving a query request to execute a precompiled query from a user of system 14 to resolve the received query request.

In certain embodiments, first database system 14 includes any device or combination of devices that may include one or more hardware, software, and/or firmware modules. For example, first database system 14 may include a parallel-processing database that includes a plurality of first nodes $20_1$-$20_M$ capable of storing, organizing, correlating, processing, and/or manipulating data. In various embodiments, each of first nodes 20 may include or have access to, for example, one or more processor modules, one or more memory modules, and/or one or more software modules. In certain embodiments, as described in more detail below with reference to FIG. 2, each of nodes 20 may include, for example, a master node, a slave node, or a combination of a master node and slave node. In this particular embodiment, each of nodes 20 operates as both a master node and a slave node.

One or more of nodes 20 on first database system 14 may include or have access to one or more precompiled queries 24. In certain embodiments, each of first nodes $20_1$-$20_M$ includes or has access to one or more precompiled queries 24. Additionally, each precompiled query 24 may be deployed to any or all of first nodes $20_1$-$20_M$. In certain embodiments, a precompiled query 24 may be operable to resolve one or more data requests received from a user of database system 14. For example, a precompiled query 24 may return one or more desired addresses or a range of addresses when any combination of one or more first names, one or more last names, or one or more social security numbers are supplied in a query request to system 14. That is, when any of a plurality of variables is supplied in a request to the database system, precompiled query 24 enables system 14 to provide the appropriate address or addresses as an output.

As another example, precompiled query 24 is operable to return any one of a plurality of desired responses or ranges of responses. In other words, when any of the plurality of variables is supplied in a query request to database system 14, precompiled query 24 enables system 14 to provide any one of a plurality of desired outputs or ranges of desired outputs. In one non-limiting example, precompiled query 24 may, when query request that includes any combination of variables is submitted to system 14, initiate the return of one or more desired responses or ranges of responses. For example, precompiled query 24 may return all vehicle owners having a specific first name, such as Richard, when any combination of one or more years a vehicle was produced, one or more vehicle makes, one or more vehicle models, one or more vehicle colors, one or more states of vehicle registration, one or more vehicle suggested retail prices, and one or more zip codes that a vehicle was sold in of vehicle is supplied in a query request to system 14.

Each precompiled query 24 may include, for example, software, code, portions of code, data compilations, and/or a combination of these or any other type of data or executable. In certain embodiments, each precompiled query 24 includes an annotated query execution graph and one or more dynamic link libraries (DLLs) capable of resolving future and/or routine data requests on system 14, such as those received from a user of system 14. Each precompiled query 24 may be associated with a series of actions or activities for resolving a query request for invoking the precompiled query 24. Activities may include, for example, one or more index reads, one or more de-duplications, one or more data sorts, one or more data rollups, or any other suitable activities according to particular needs. In certain embodiments, each precompiled query 24 is associated with a query execution graph representing the series of actions or activities for resolving a query request invoking the precompiled query 24. In some cases, precompiled query 24 was created using a programming language compiler, such as an ECL compiler, that converts a representation of a desired query into intermediary source code and/or a query execution graph. In those cases, the programming language compiler may have mapped each activity associated with the query execution graph to portions of the intermediary source code and/or one or more data files associated with the respective activity.

As an example, a representation of a query may have been converted into intermediary source code and a query execution graph, and the intermediary source code may have been compiled to generate one or more executables in machine-level code. In some cases, the intermediary source code may have been converted, using a programming language compiler, such as a C++ compiler, into the one or more executables. In various embodiments, the one or more executables may include, for example, dynamically-linked executables, fully-linked executables, or a shared library. In this example, the one or more executables include DLLs that are capable of being executed dynamically, in whole or in part, by other executables.

In certain embodiments, each activity associated with the query execution graph may be annotated and mapped to one or more DLLs and/or data files or tables associated with the respective activity. In some cases, one or more helper files capable of assisting in the processing of the annotated execution graph may have been created. The helper files may, for example, identify the appropriate DLLs and/or data files or tables for processing a particular activity associated with the annotated query execution graph. These helper files may be stored on or otherwise be accessible to nodes 20 of first database system 14.

Each activity associated with the query execution graph may be assigned a unique identification, which may be referred to as an activity ID. Each activity ID may uniquely identify the activity associated with the activity ID with respect to other activities in the query execution graph for a particular precompiled query 24. In certain embodiments, the activity ID may include a first ID, which identifies the particular precompiled query 24 with which the activity identified by the activity ID is associated, and a second ID, which uniquely identifies the activity identified by the activity ID with respect to other activities associated with the particular precompiled query 24. As an example, if the query execution graph includes an index read, each activity of the index read may be assigned a unique activity ID. In other cases, each activity may be mapped to a data file location within a database such as database 14. In those cases, a table or index that identifies the location and/or content of data files or tables stored within a database system such as database 14 may be used to perform the mapping.

Database system 14 may include one or more data tables that are distributed over one or more of nodes 20, each portion of a data table that is stored on one or more of nodes 20 being stored as a key part 30. As used throughout this description, the term "table" refers to any data structure, arrangement, or compilation of information. In some cases, each data table may be distributed across each of nodes $20_1$-$20_M$. For example, a portion of each data table may be stored on each of nodes $20_1$-$20_M$ as key parts 30. In certain embodiments, each node 20 of database system 14 includes a portion of each key part 30. Each key part 30 may be associated with one or more precompiled queries 24 and include data for resolving a query request corresponding to the associated precompiled query 24.

The data stored within each key part 30 is typically sorted according to one or more precompiled queries 24. For example, when a precompiled query 24 is created to return a desired response when any of a plurality of variables is provided to first database system 14, the data in each key part 30 may be sorted according to various combinations of the variables. As used through this description, the term "key part" refers to a portion of a sorted data file that includes data capable of satisfying and/or identifying the location of additional data that satisfies at least a portion of a precompiled query 24.

As one particular non-limiting example, a precompiled query 24 is capable of returning a desired address when any of a combination of first name, last name, or social security number is provided to first database system 14. In that case, the data stored in key parts 30 may be sorted according to various combinations of the input variables. For example, the data in the tables may be sorted by first name, last name, and social security number; by social security number and address; or by any other appropriate combination. In some cases, a user may be able to identify one or more combinations of input variables to be used in processing precompiled query 24.

Each key part 30 may be associated with a top level key 32 stored on one or more of nodes 20. Top level keys 32 operate to identify the location within database system 14 of each key part 30. For example, where database system 14 includes a distributed table that is sorted by first name, top level key 32 identifies the location of each key part 30 of the distributed table. Thus, if a first key part 30 was stored on node $20_1$ and included first names ranging from Aaron to Brian, and a twentieth key part 30 was stored on node $20_{20}$ and included first names ranging from Frank to Gavin, then top level key 32 would identify that first names ranging from Aaron to Brian are on node $20_1$ and first names ranging from Frank to Gavin are on node $20_{20}$. Top level keys 32 may include any other suitable information, according to particular needs.

In some cases, top level key 32 and key parts $30_1$-$30_N$ can include additional information to assist in identifying the appropriate location of additional data. For example, if top level key 32 was created to identify the location of key parts 30 associated with a distributed table sorted by first name, then top level key 32 may include the first name, last name, and address of the last record associated with the respective key part 30.

As such, first database system 14 may be pre-keyed (i.e., prior to processing query requests, such as requests to execute one or more precompiled queries 24). As used throughout this document, the term "pre-key" or "pre-keyed" refers to deploying one or more key parts, one or more top level keys, and/or one or more indices on a database system in advance of or simultaneously with a user requesting data from such key parts or indices (e.g., using a query request). One aspect of this disclosure recognizes that deploying one or more precompiled queries and pre-keying a database system can increase the processing efficiency of the database system for routine and/or standard data requests.

In certain embodiments, system 10 includes a second database system 40, which may be coupled to first database system via a link 42. In such embodiments, second database system 40 may store the data that is to be the subject of precompiled queries 24, prior to that data being stored on database system 14. Furthermore, in some cases, key parts 30 and top level keys 32 may be created using second database system 40 and later communicated to first database system 14. The following example describes just one way of pre-keying first database system 14 using second database system 40. The present invention contemplates pre-keying first database system 14 in any suitable manner, with or without using second database system 40.

In this example, second database system 40 is capable of performing one or more desired computing and/or communicating functionalities. For example, second database system 40 may be capable of storing, organizing, sorting, distributing, processing, correlating, and/or communicating data associated with one or more raw data files. Second database system 40 may comprise any device or combination of devices that may include one or more hardware, software, and/or firmware modules. In this example, second database system 40 includes a parallel-processing database that includes a plurality of second nodes $44_1$-$44_N$ capable of storing, organizing, correlating, processing, distributing, and/or manipulating data. In various embodiments, each of second nodes 44 may include or have access to, for example, one or more processor modules, one or more memory modules, and/or one or more software modules.

In certain embodiments, second database system 40 may include one or more processors capable of managing the organization of the stored data and coordinating the retrieval of the data from second nodes $44_1$-$44_N$ in response to queries, commands, and/or requests received by second database system 40. In various embodiments, second database system 40 can receive requests, commands, and/or queries in a standard format, such as structured query language (SQL), extensible markup language (XML), hypertext markup language (HTML), or any other desired format.

In this example, a query representation may be communicated to second database system 40, from client 12 or from any other suitable source for example and in any suitable manner. The query representation may be used to generate a precompiled query 24 for the query representation. The query representation may include, for example, software, code, portions of code, data compilations, and/or a combination of these or any other type of data or executable. For example, the query representation may include an HTML document that represents a query that is capable of resolving future and/or routine data requests on system 14. In other embodiments, the query representation could include, for example, an XML document, a text file, or any other representation of the desired query.

In various embodiments, second database system 40 processes the query representation and performs certain computing functions to resolve one or more activities associated with the query representation. In some cases, second database system 40 may process the query representation and perform one or more sorts on portions of the data stored on nodes $44_1$-$44_N$. In those cases, the sorts of the data can result in the formation of one or more distributed tables of the data necessary to resolve at least a portion of the query representation. For example, where the query representation is created to return a desired response when any of a plurality of variables is provided to first database system 14, second database system 40 operates to sort the appropriate data according to various combinations of the variables.

As one particular non-limiting example, the query representation is capable of returning a desired address when any combination of first name, last name, or social security number is provided to first database system 14. In that case, second database system 40 processes the query representation and sorts the data according to various combinations of the input variables. For example, second database system 40 may sort the data by first name, last name, and address; by last name and address; by social security number and address; or by any other appropriate combination.

In most cases, the one or more sorts of the data within second database system 40 create one or more tables that are distributed over one or more of second nodes $44_1$-$44_N$. In some cases, the sort of the data within second database system 40 creates a table that is distributed over each of nodes $44_1$-$44_N$. In various embodiments, each of second nodes $44_1$-$44_N$ that receives a portion of the distributed table stores that portion as a key part 30.

Moreover, the sort of the data within second database system 40 also generates a top level key 32 for each table. Top level key 32 operates to identify the location within database system 40 of each key part 30 associated with the respective table. For example, where second database system 40 generates a distributed table that is sorted by first name, top level key 32 identifies the location of each key part $30_1$-$30_N$ of the distributed table. Thus, if a first key part $30_1$ was stored on node $44_1$ and included first names ranging from Aaron to Brian, and a twentieth key part $30_{20}$ was stored on node $44_{20}$ and included first names ranging from Frank to Gavin, then top level key 32 would identify that first names ranging from Aaron to Brian are on node $44_1$ and first names ranging from Frank to Gavin are on node $44_{20}$.

In some cases, top level key 32 and key parts $30_1$-$30_N$ can include additional information to assist in identifying the appropriate location of additional data. For example, if top level key 32 is created to identify the location of key parts 30 associated with a distributed table sorted by first name, then the top level key 32 may include the first name, last name, and address of the last record associated with the respective key part 30.

In this particular embodiment, after creation of key parts $30_1$-$30_N$ and top level key 32, second database system 40 operates to pre-key first database system 14. For example, a precompiled query 24 may be communicated to first database system 14, originating from client 12 as a query representation for example. In certain embodiments, first database system 14 deploys precompiled query 24 on at least one of first nodes 20. In other embodiments, first database system 14 deploys precompiled query 24 on each of first nodes $20_1$-$20_M$. In this particular example, precompiled query 24 is deployed on node $20_1$. In that example, node $20_1$ distributes a copy of precompiled query 24 to each of nodes $20_2$-$20_M$. Although precompiled query 24 is deployed to node $20_1$ in this example, precompiled query 24 may be deployed to any or all of nodes $20_1$-$20_M$ without departing from the scope of the present disclosure.

In this particular embodiment, node $20_1$ operates to read the annotated query execution graph associated with precompiled query 24 and identify one or more data files or tables necessary to satisfy a particular activity of precompiled query 24. Although node $20_1$ operates to read the query execution graph and identify one or more data files or tables in this example, any or all of node $20_1$-$20_M$ can perform the desired functionality without departing from the scope of the present invention. In some cases, node $20_1$ can identify the one or more data files or tables using the mapping of each activity to the one or more DLL's and/or data files or tables. In other cases, node $20_1$ can identify the one or more data files or tables using the one or more helper files associated with precompiled query 24. In various embodiments, node $20_1$ may be capable of generating and/or communicating one or more data requests to acquire the necessary data from its permanent location, such as a location within a database system.

In this example, node $20_1$ of first database system 14 communicates one or more requests to acquire the necessary data from second nodes $44_1$-$44_N$ of second database system 40. Node $20_1$ communicates the one or more requests to second database system 40 through communications link 42. In this example, second database system 40 receives and processes the one or more requests to communicate data necessary to resolve precompiled query 24. Second database system 40 then operates to pre-key first database system 14 by communicating copies of key parts $30_1$-$30_N$ and top level key 32 associated with each sorted table to first database system 14.

Unlike conventional database systems that typically combine all the key parts into a single key or index, first database system 14 stores each individual key part 30 separately on the appropriate first node 20. In this example, first database system 14 distributes key parts 30 stored on second nodes 44 over first nodes $20_1$-$20_M$. In some cases, the number of first nodes 20 of first database system 14 can be different than the number of second nodes 44 of second database system 40. In this particular embodiment, the number of first nodes 20 is less than the number of second nodes 44. Thus, at least some of nodes $20_1$-$20_M$ may store more than one key part 30. In various embodiments, each of key parts $30_1$-$30_N$ may be stored on more than one of first nodes $20_1$-$20_M$. One aspect of this disclosure recognizes that, in certain embodiments, storing copies of each key part 30 on multiple first nodes 20 enhances the systems reliability by providing redundancy which can minimize the effects of a single failure of a first node 20 on first database system 14.

In one non-limiting example, second database system 40 includes four-hundred second nodes $44_1$-$44_{400}$ and first database system 14 includes forty first nodes $20_1$-$20_{40}$. Although this example implements four-hundred second nodes 44 and forty first nodes 20, any number of second nodes 44 and first nodes 20 can be used without departing from the scope of the present disclosure. In that example, if each of second nodes $44_1$-$44_{400}$ store a respective key part $30_1$-$30_{400}$ associated with a sorted table, then first database system 14 would distribute each of those four-hundred key parts $30_1$-$30_{400}$ over first nodes $20_1$-$20_{40}$. In various embodiments, first database system 14 could distribute key parts $30_1$-$30_{400}$ such that first node $20_1$ receives key parts $30_1$, $30_{41}$, $30_{81}$, . . . $30_{241}$, from second nodes $44_1$, $44_{41}$, $44_{81}$, . . . $44_{241}$, and first node $20_{40}$ receives key parts $30_{40}$, $30_{80}$, $30_{120}$, . . . $30_{400}$ from second nodes $44_{40}$, $44_{80}$, $44_{120}$, . . . $44_{400}$. In some embodiments, first database system 14 could distribute key parts $30_1$-$30_{400}$ such that first node $20_1$ receives key parts $30_1$-$30_{10}$ from second nodes $44_1$-$44_{10}$, and first node $20_{40}$ receives key parts $30_{91}$-$30_{400}$ from second nodes $44_{391}$-$44_{400}$. In other embodiments, first database 14 could distribute key parts $30_1$-$30_{400}$ in any other suitable manner.

In this example, second database system 40 also communicates top level keys 32 to node $20_1$ of first database system 14. In other embodiments, second database system 40 can communicate top level keys 32 to any or all of nodes $20_1$-$20_M$. In this particular embodiment, first node $20_1$ distributes top level key 32 to each of first nodes $20_1$-$20_M$. In other embodiments, any one of first nodes 20 may be capable of distributing top level key 32 to each of first nodes $20_1$-$20_M$.

In this particular embodiment, system 14 operates to map the location of each key part $30_1$-$30_N$ from its respective second node 44 to one or more communication channels associated with first database system 14. In this example, a particular node 20 that is processing a request to execute a particular precompiled query 24 operates to map the location of each key part $30_1$-$30_N$ from its respective second node 44 to one or more communication channels associated with first database system 14. In some cases, the particular node 20 may have access to one or more helper files that may assist in mapping the location of each key part $30_1$-$30_N$ to one or more communication channels. In this example, each first node 20 has access to a function capable of mapping the location of key parts 134 to one or more channel numbers associated with database system 14. For example, the function may comprise "part_no MOD num_channels," where MOD represents the modulus operation, part_no represents the part number retrieved for the top level key 32, and num_channels represents the number of communication channels.

In one non-limiting example, second database system 40 includes four-hundred second nodes $44_1$-$44_{400}$ and first database system 14 includes forty first nodes $20_1$-$20_{40}$. First database system 14 also includes forty communication channels capable of carrying a multicast communication signal to one or more first nodes $20_1$-$20_{40}$. Although this example implements forty communication channels within first database system 14, any number of communication channels can be used without departing from the scope of the present disclosure. In that example, if each of second nodes $40_1$-$40_{400}$ store a respective key part $30_1$-$30_{400}$ associated with a sorted table, then first database system 14 may distribute each of those four-hundred key parts $30_1$-$30_{400}$ over first nodes $20_1$-$20_{40}$.

In various embodiments, first database system 14 could distribute key parts $30_1$-$30_{400}$ such that first node $20_1$ receives key parts $30_1$, $30_{41}$, $30_{81}$, . . . $30_{361}$, from second nodes $40_1$, $40_{41}$, $40_{81}$, . . . $40_{361}$, and first node $20_{40}$ receives key parts $30_{40}$, $30_{80}$, $30_{120}$, . . . $30_{400}$ from second nodes $40_{40}$, $40_{80}$, $40_{120}$, . . . $40_{400}$. Moreover, first database system 14 could distribute key parts $30_1$-$30_{400}$ such that first node $20_1$ also receives key parts $30_{40}$, $30_{80}$, $30_{120}$, . . . $30_{400}$ from second nodes $40_{40}$, $40_{80}$, $40_{120}$, . . . $40_{400}$ to add redundancy to system 14. In some embodiments, first database system 14 could distribute key parts $30_1$-$30_{400}$ such that first node $20_1$ receives key parts $30_1$-$30_{10}$ from second nodes $40_1$-$40_{10}$, and first node $20_{40}$ receives key parts $30_{391}$-$30_{400}$ from second nodes $40_{391}$-$40_{400}$. In other embodiments, first database system 14 could distribute key parts $30_1$-$30_{400}$ in any other suitable manner.

In this particular non-limiting example, first node $20_1$ receives a query request from a user (e.g., a user of client system 12) to execute a particular precompiled query $24_9$. In processing precompiled query $24_9$, node $20_1$ identifies an activity that necessitates the retrieval of a key part $30_{77}$ stored at least on nodes $20_{17}$ and $20_{27}$. First node $20_1$ accesses the appropriate top level key 32 for precompiled query $24_9$ and maps the location of key part $30_{77}$ from second node $44_{77}$ to a particular communication channel, such as channel fifteen. In this particular embodiment, both of nodes $20_{17}$ and $20_{27}$ are capable of receiving one or more requests at least on communication channel fifteen.

Although formation of key parts 30 and top level keys 32 has been described in a particular manner (i.e., using second database system 40), the present invention contemplates forming key parts 30 and top level keys 32 in any suitable manner, according to particular needs. As just one example, key parts 30 and top level keys 32 may be dynamically created as one or more query requests are received by database system 14, from client 12 for example. Furthermore, although second database system 40 has been described as storing the data that is to be the subject of precompiled queries 24, prior to that data being stored on database system 14, the present invention contemplates database system 14 acquiring the data that is to be the subject of precompiled queries 24 from any suitable source, according to particular needs. Moreover, in the described embodiment of system 10, each of first database system 14 and second database system 40 includes a separate database system. In an alternative embodiment, first database system 14 and second database system 40 could each be part of a common larger database system. Moreover, each of first nodes 20 could form part of second nodes 44.

In certain embodiments, one or more clients 12 couple to system 10 through network 16. Each client 12 may include any computing and/or communication device operable to communicate and/or receive information. For example, each client 12 may include a web server, a work station, a main-frame computer, a mini-frame computer, a desktop computer, a laptop computer, a personal digital assistant, a wireless device, and/or any other computing or communicating device or combination of devices. In operation, each client 12 may execute with any of the well-known MS-DOS, PC-DOS, OS-2, MAC-OS, WINDOWS™, UNIX, or other appropriate operating systems. Moreover, "client 12" and "user of client 12" may be used interchangeably without departing from the scope of this invention. Although a single client 12 is illustrated, the present invention contemplates any suitable number of clients 12 being coupled to database system 14, and database system 40 where appropriate.

In certain embodiments, client 12 includes a query submission module 50 and a graphical user interface (GUI) 52 that enable a user to submit one or more query requests 54 for processing by database system 14 and to view results of the submitted query requests 54 returned by database system 14. For example, client 12 may submit one or more query requests 54 using query submission module 50. In some cases, query submission module 50 and GUI 52 enable a user to submit a query request 54 that includes one or more data requests on system 14. For example, a user of client 12 may submit a query request 54 that specifies one or more variables for retrieval of a result based on the one or more variables. In a particular example, a user of client 12 may submit a query request 54 for returning a desired address when any combination of a first name, a last name, or a social security number is supplied in a query request 54 to system 14. That is, when any of the plurality of variables is supplied in a query request 54 to database system 14, query request 54 prompts system 14 to provide the appropriate address as an output.

In certain embodiments, query request 54 corresponds to one or more of precompiled queries $24_1$-$24_W$ stored on one or more nodes 20 of system 14. For example, query request 54 may include a request for system 14 to initiate an instance of a precompiled query 24 based on the one or more variables submitted in the query request 54. Although query requests 54 that correspond to a precompiled query 24 stored on system 14 are primarily described, the present invention contemplates receiving and processing query requests 54 that do not have a corresponding precompiled query 24. Such query requests 54 lacking a corresponding precompiled query 24 may be processed by, for example, dynamically creating in any suitable manner one or more key parts 30 and corresponding top level key 32 for resolving the query request 54.

Query submission module 50 may include any device or combination of devices that may include one or more hardware, software, and/or firmware modules. In certain embodiments, query submission module 50 includes, for example, software capable of being executed on client 12. In certain embodiments, query submission module 50 may include the necessary hardware, software, and/or firmware capable of providing an XML or HTML template for display on GUI 52, on a web browser for example.

In certain embodiments, query submission module 50 may display a form that includes one or more fields in which a user of client 12 may insert or select one or more search terms (i.e., input variables) as part of query request 54. Query request 54 may identify, be linked to, or otherwise be associated with one or more precompiled queries 24 stored on database system 14. As just one example, a user may provide or select input variables that include any combination of a first name, last name, or a social security number as part of query request 54, requesting database system 14 to return one or more desired addresses for the provided input variables.

In certain embodiments, query submission module 50 and/or GUI 52 enables a user of client 12 to submit a desired query request 54 that is precompiled in one or more query programming languages. The programming language can include, for example, C++, Enterprise Control Language (ECL), Simple Query Language (SQL), Perl, or a combination of these or other programming languages. A query request 54 submitted using client 12 may be in any suitable format, including XML, hypertext transfer protocol (HTTP), ECL, or any other suitable format.

Network 16 may include any wireless network, wireline network, or combination of wireless and wireline networks capable of supporting communication between network elements using ground-based and/or space-based components. For example, network 16 may include a data network, a public switched telephone network (PSTN), an integrated services digital network (ISDN), a local area network (LAN), a wide area network (WAN), a metropolitan area network (MAN), all or a portion of the global computer network known as the Internet, and/or other communication systems or combination of communication systems at one or more locations.

In certain embodiments, system 10 includes a query receiving module 60 for receiving query requests 54 submitted to system 14 by client 12. In certain embodiments, network 16 couples to client 12 through a communications link 62 and to query receiving module 60 through a communications link 64. In certain embodiments, query receiving module 60 operates to route or otherwise direct query requests 54 submitted by client 12 to appropriate components within system 14. First database system 14 may be coupled to query receiving module 60 via a link 66, and query receiving module 60 may be separate from database system 14. Alternatively, query receiving module 60 may a part of system 14. Query receiving module 60 may include any device or combination of devices that may include one or more hardware, software, and/or firmware modules.

Query receiving module 60 may route query requests 54 received from client 12 to one or more suitable components within database system 14 in any suitable manner. For example, in certain embodiments, query receiving module 60 may route query requests to one or more of nodes $20_1$-$20_M$. Query receiving module 60 may include a router or other suitable component for routing query requests 54 to one or more suitable components within database system 14, such as nodes 20. Query receiving module 60 may include load balancing capabilities, as described in more detail below.

In the illustrated embodiment, system 10 includes at least communication links 42, 62, 64, and 66 each operable to facilitate the communication of data and/or queries within system 10. Communications links 42, 62, 64, and 66 may include any hardware, software, firmware, or combination thereof. In various embodiments, communications links 42, 62, 64, and 66 may comprise communications media capable of assisting in the communication of analog and/or digital signals. Communications links 42, 62, 64, and 66 may, for example, comprise a twisted-pair copper telephone line, a fiber optic line, a Digital Subscriber Line (DSL), a wireless link, a USB bus, a PCI bus, an Ethernet interface, or any other suitable interface operable to assist in the communication within system 10.

Figure 2:
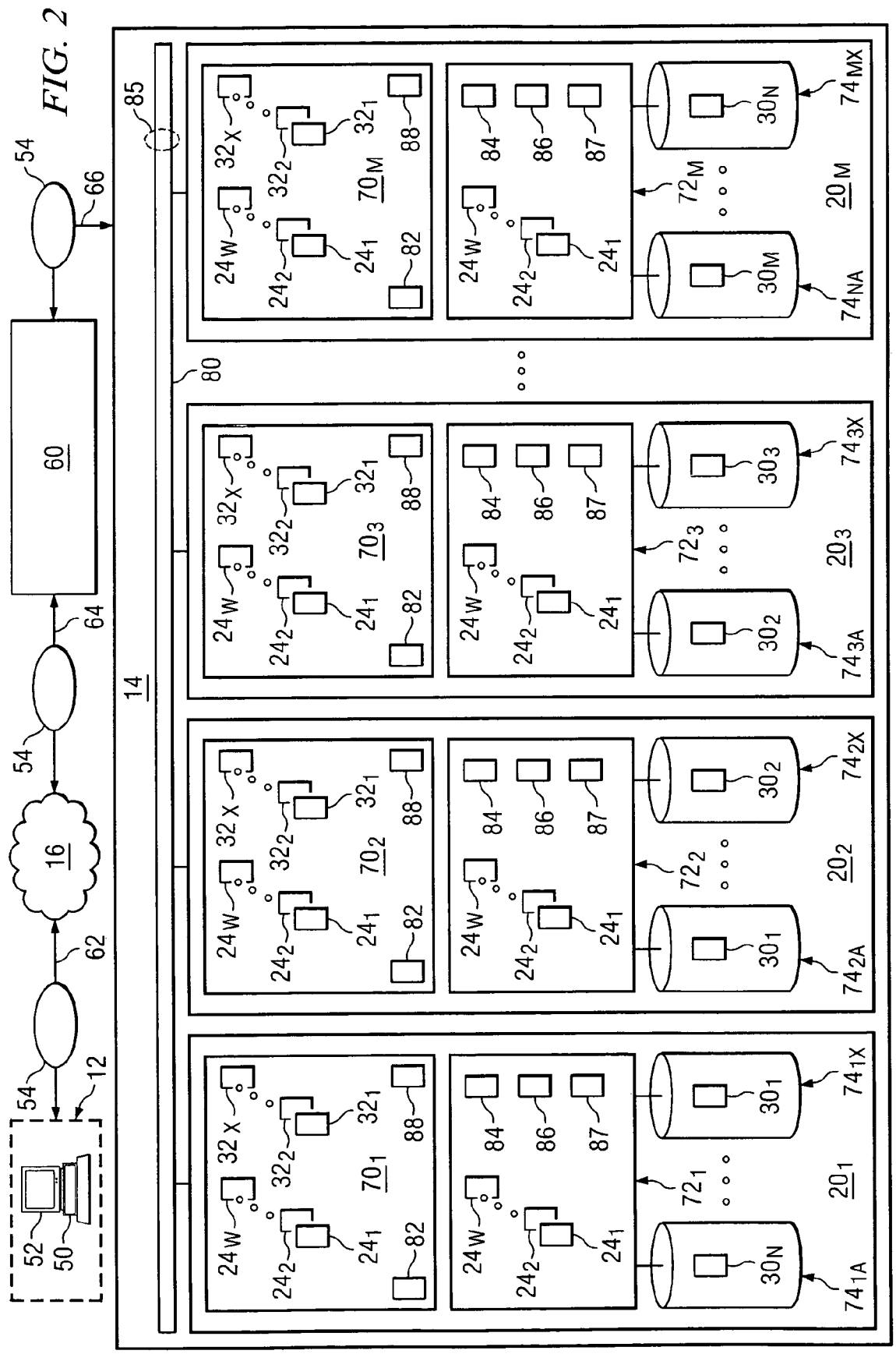
FIG. 2 illustrates an example embodiment of a database system for processing one or more query requests associated with one or more precompiled queries deployed on one or more nodes of the database system.

FIG. 2 illustrates an example embodiment of database system 14 for processing one or more query requests 54 associated with one or more precompiled queries $118_1$-$118_W$ deployed on one or more nodes 20 of database system 14. In this example, database system 14 stores precompiled queries $24_1$-$24_W$, key parts $30_1$-$30_N$ associated with one or more precompiled queries $24_1$-$24_W$, and one or more top level keys $32_1$-$32_X$ associated with precompiled queries $24_1$-$24_W$. Moreover, first database system 14 is operable to execute one or more precompiled queries $24_1$-$24_W$ upon receiving a query request 54 from a user of system 14, requesting system 14 to execute a particular one or more precompiled queries 24. In this particular embodiment, each of precompiled queries $24_1$-

$24_W$ includes an annotated query execution graph, one or more DLL's, and/or one or more helper files.

In this particular embodiment, each of precompiled queries $24_1$-$24_W$ is capable of resolving one or more routine and/or standard data requests that may have variations in input variables. For example, precompiled query $24_2$ may be capable of returning one or more desired addresses or range of addresses when any combination of one or more first names, one or more last names, or one or more social security numbers are provided to first database system 14 (e.g., in a query request 54), while precompiled query $24_3$ may be capable of returning a first name, last name, and state of registration, for all owners of one or more specific make, model, year, and/or color of one or more vehicles (e.g., when so requested in a query request 54). One aspect of this disclosure recognizes that, in certain embodiments, deploying precompiled queries $24_1$-$24_W$ may increase the processing efficiency of first database system 14 for routine and/or standard data requests that have a number of variations on the input parameters.

In this example, database system 14 comprises a parallel-processing database that includes a plurality of nodes $20_1$-$20_M$. In certain embodiments, each of nodes 20 of first database system 14 includes a master node 70, a slave node 72, and one or more memory modules 74. Although each of nodes $20_1$-$20_M$ includes master node 70, slave node 72, and memory module 74 in this example, each of nodes 20 may include any other appropriate device, or may exclude one or more of master node 70, slave node 72, or memory module 74 without departing from the scope of the present disclosure. Although an embodiment of system 10 in which each of nodes 20 operates as both a master node and a slave node is primarily described, it should be understood that each node 20 may operate as a master node, a slave node, or a combination of a master node and slave node. In this particular embodiment, the number of master nodes 70 is the same as the number of slave nodes 72. In some embodiments, the number of slave nodes 72 can be larger than the number of master nodes 70. In other embodiments, the number of master nodes 70 can be larger than the number of slave nodes 72.

In this particular embodiment, precompiled queries $24_1$-$24_W$ and top level keys $32_1$-$32_X$ have been deployed to and stored on each of master nodes $70_1$-$70_M$. In some cases, a particular precompiled query 24 and top level keys 32 associated with the particular precompiled query 24 may be deployed to and stored on one of master nodes $70_1$-$70_M$. In that example, the master node 70 that receives the particular precompiled query 24 and associated top level keys 32 operates to distribute a copy of the respective precompiled query 24 and top level keys 32 to each of the other master nodes $70_1$-$70_M$. In other embodiments, each of precompiled queries $24_1$-$24_W$ and top level keys $32_1$-$32_X$ are distributed to and stored on each of master nodes $70_1$-$70_M$. In certain embodiments, a copy of precompiled queries $24_1$-$24_W$ is stored on each of slave nodes $72_1$-$72_M$. For example, one or more of master nodes 70 may have distributed precompiled queries $24_1$-$24_N$ to slave nodes $72_1$-$72_M$.

In this example, each master node $70_1$-$70_M$ is capable of executing each of precompiled queries $24_1$-$24_W$ upon receiving a query request 54 from a user of system 14, such as client 12. Moreover, each master node $70_1$-$70_M$ is capable of communicating a request to perform a particular activity associated with a particular precompiled query 24, such as, a request to perform an index read, to one or more slave nodes $72_1$-$72_M$ (e.g., on the same or on different node 20 as the master node $70_1$-$70_M$) for processing in accordance with one or more of precompiled queries $24_1$-$24_W$. In some cases, the request to perform a particular activity can include, for example, one or more variables associated with a request supplied by a user of system 14. In various embodiments, each master node $70_1$-$70_M$ is capable of communicating the request to perform a particular activity using a multicast signal formatted in, for example, User Datagram Protocol (UDP).

Master nodes $70_1$-$70_M$ may comprise any device or combination of devices that may include one or more hardware, software, and/or firmware modules. In this particular embodiment, each master node $70_1$-$70_M$ includes or has access to a memory that stores each precompiled query $24_1$-$24_W$ deployed on system 14 and each top level key $32_1$-$32_X$ associated with each deployed precompiled query $24_1$-$24_W$.

In this example, each slave node $72_1$-$72_M$ is capable of storing each precompiled query 24 received from a particular master node 70. In addition, each of slave nodes $72_1$-$72_M$ is capable of processing one or more requests to perform one or more particular activities associated with a specific precompiled query 24. Slave nodes $72_1$-$72_M$ may comprise any device or combination of devices that may include one or more hardware, software, and/or firmware modules. In some cases, each of slave nodes $72_1$-$72_M$ may have access to and/or include one or more helper files that may assist each of slave nodes $72_1$-$72_M$ in processing a request to perform one or more particular activities.

In this example, each of slave nodes $72_1$-$72_M$ has access to one or more memory modules 74 capable of storing one or more key parts 30. In other embodiments, each of slave nodes $72_1$-$72_M$ may include one or more memory modules 74. Memory modules 74 may include any hardware, software, firmware, or combination thereof operable to store and facilitate retrieval of information. Each memory module 74 may store information using any of a variety of data structures, arrangements, and/or compilations. Memory module 74 may, for example, include a hard disk, a dynamic random access memory (DRAM), a static random access memory (SRAM), or any other suitable volatile or nonvolatile storage and retrieval device or combination of devices.

In this particular embodiment, each of slave nodes $72_1$-$72_M$ stores and provides access to key parts 30 associated with at least another one of slave nodes $72_1$-$72_M$. Moreover, each of slave nodes $72_1$-$72_M$ is capable of receiving multicast signals on more than one communication channel. For example, slave node $72_2$ operates to receive multicast communication signals on communication channels one and two, and stores and provides access to key parts $30_1$ and $30_2$. Meanwhile, slave node $72_3$ operates receive multicast communication signals from communication channels two and three, and stores and provides access to key parts $30_2$ and $30_3$. Thus, slave nodes $72_2$ and $72_3$ each receive a multicast signal communicated on communication channel two and provide access to data associated with key parts $30_2$ and thereby add redundancy to system 14. In certain embodiments, each of slave nodes $72_1$-$72_M$ registers with one or more of the communication channels in order to receive multicast signals sent on the one or more communication channels. For example, slave nodes 72 may register with certain communication channels based on the key parts 30 to which the slave nodes have access. As another example, slave nodes 72 may be assigned to register with certain communication channels in any suitable manner.

In various embodiments, system 14 is configured such that each of slave nodes $72_1$-$72_M$ that receive multicast signals from a particular communication channel and that store and/or provide access to a particular key part 30 are not susceptible to a single point of failure. One aspect of this disclosure recognizes that, in certain embodiments, storing copies of each key part 30 on multiple slave nodes 72 that are capable of receiving a multicast signal on a particular communication channel enhances the systems reliability by providing system redundancy. In most cases, the provision of system redundancy can minimize the effects of a single failure of a particular slave node 72 on first database system 14. Moreover, processing of requests communicated by master nodes 70 may be divided between multiple slave nodes 72. For example, if one or more master nodes 70 are communicating requests to perform index reads of a particular key part 30, more than one slave node 72 may receive and process the index read because more than one slave node 72 has access to the particular key part 30. This may allow the processing load for requests involving a particular key part 30 to be spread between or among multiple slave nodes 72.

In this example, a network 80 couples each of nodes 20 to each other. Network 80 may include any wireless network, wireline network, or combination of wireless and wireline networks capable of supporting communication between network elements. For example, network 80 may comprise a data network, a public switched telephone network (PSTN), an integrated services digital network (ISDN), a local area network (LAN), a wide area network (WAN), a metropolitan area network (MAN), all or a portion of the global computer network known as the Internet, and/or other communication systems or combination of communication systems at one or more locations. In various embodiments, network 80 is capable of transmitting information from master nodes $70_1$-$70_M$ to one or more slave nodes $72_1$-$72_M$ over a plurality of communication channels.

In one non-limiting example, system 14 includes forty master nodes $70_1$-$70_{40}$ and forty slave nodes $72_1$-$72_{40}$. Although this example includes forty master nodes 70 and slave nodes 72, any number of master nodes 70 and slave nodes 72 may be used without departing from the scope of the present disclosure. Moreover, in this example, system 14 includes or has access to forty communication channels. In other embodiments, system 14 may include, for example, two communication channels, ten communication channels, twenty communication channels, or more.

As described above with reference to FIG. 1, one or more clients 12 may couple to system 14 through network 16. Although a single client 12 is illustrated, the present invention contemplates any suitable number of clients 12 being coupled to database system 14. Each client 12 may include substantially similar components and be capable of substantially similar functionality to that described above with reference to FIG. 1. Clients 12 may submit one or more query requests 54 to database system 14 for processing by system 14, using query submission module 50 and GUI 52 for example. Clients 12 may also view results of the submitted query requests 54 returned by database system 14, using one or more of query submission module 50 and GUI 52 for example.

In some cases, query submission module 50 and GUI 52 enable a user to submit a query request 54 that includes one or more data requests on system 14. For example, a user of client 12 may submit a query request 54 that specifies one or more variables for retrieval of a result based on the one or more variables. In a particular example, a user of client 12 may submit a query request 54 for returning a desired address when any combination of a first name, a last name, or a social security number is supplied in a query request 54 to system 14. That is, when any of the plurality of variables is supplied in a query request 54 to database system 14, query request 54 enables system 14 to provide the appropriate address as an output.

In certain embodiments, query request 54 corresponds to one or more of precompiled queries $24_1$-$24_W$ stored on one or more nodes 20 of system 14. For example, the query request 54 include a request for system 14 to initiate an instance of a precompiled query 24 based on the one or more variables submitted in the query request 54. Although query requests 54 that correspond to a precompiled query 24 stored on system 14 are primarily described, the present invention contemplates receiving and processing query requests 54 that do not have a corresponding precompiled query 24. Such query requests 54 lacking a corresponding precompiled query 24 may be processed by, for example, dynamically building in any suitable manner one or more key parts 30 for resolving the query request 54.

As described above with reference to FIG. 1, in certain embodiments, system 10 includes a query receiving module 60 for receiving query requests 54 submitted by client 12 to system 14. Query receiving module 60 may operate to route or otherwise direct query requests 54 submitted by client 12 to appropriate components within system 10. Query receiving module 60 may route query requests 54 received from client 12 to one or more suitable components within database system 14 in any suitable manner. For example, in certain embodiments, query receiving module 60 may route query requests 54 to one or more of master nodes $70_1$-$70_M$. Query receiving module 60 may include a router or other suitable component for routing query requests 54 to one or more suitable components within database system 14, such as master nodes 70.

In certain embodiments, master nodes 70 receive and assume primary responsibility for processing query requests 54 received by system 14. One or more master nodes 70 may receive query request 54, although it may be desirable for only one master node 70 to receive query request 54. In certain embodiments, query requests 54 may be communicated to master nodes 70 in a manner for optimizing load balancing between master nodes 70. For example, query receiving module 60 may include load balancing capabilities and may route query requests 54 to particular master nodes 70 in a manner that optimizes the processing load of master nodes 70.

In alternative embodiments, particular master nodes 70 may be pre-assigned to one or more clients 12 for handling query requests received from those clients 12. In such embodiments, query receiving module 60 may route query requests 54 to particular master nodes 70 based on the clients 12 that submitted the query requests 54. Although query receiving module 60 is described, the present invention contemplates system 14 receiving query requests 54 from client 12 and routing those query requests 54 to appropriate master nodes 70 in any suitable manner according to particular needs, with or without query receiving module 60. Furthermore, it may also be desirable to limit or otherwise control the number of queries that a particular client 12 may have running on system 14 at a particular time.

In certain embodiments, each master node 70 may be operable to receive and process a predetermined number of query requests 54 substantially concurrently. For example, a master node 70 may include a particular number of threads, each operable to receive and process a different query request 54. It should be understood that "different" in this context does not necessarily mean that the information sought by the query request 54 or the parameters provided in the query request 54 (e.g., by a client 12) are different. For example, each thread may be operable to receive and process a different instance of the same query request 54. It may be desirable to assign, either exclusively or non-exclusively, a particular number of these threads to each particular client 12. As an example, a particular master node 70 may include thirty threads, twenty of which are available to a first client 12 and ten of which are available to a second client 12. In certain embodiments of this example, when the first client 12 is using all of twenty of its threads on the particular master node 70, the client 12 may be directed to another master node 70 or denied access to system 14 until such time as one of the twenty nodes available to the first client 12 become available. Additionally or alternatively, if the second client 12 is not currently using the ten threads of the particular master node 70 assigned to the second client 12 such that one or more of the ten threads are currently idle, then the an operating system (OS) scheduler may adjust the central processing unit (CPU) cycles such that no or fewer clock cycles are used on the idle threads. As a particular example, if the first client 12 is currently using all twenty of its available threads and the second client 12 is not currently using any of its ten threads, all CPU clock cycles may be used by the twenty threads assigned to the first client 12, thereby increasing the speed at which query requests 54 submitted by the first client 12 are processed. These and other techniques may help to manage and/or increase throughput in processing of query requests 54 submitted to system 14.

Additionally, in certain embodiments, if no threads are available on a particular master node 70 for a particular client 12 to submit query requests 54, the particular client 12 may be notified that the particular master node 70 is too busy. The particular client 12 may then select a different master node 70 for submitting query requests 54 or may pause and retry submitting query requests 54 on the particular master node 70. For example, system 14 may prompt the particular client 12 to either select a different master node 70 or retry the particular master node 70 after a suitable delay.

Although the above example describes first and second clients 12, any suitable number of clients 12 may be coupled to system 14, and one or more threads of one or more master nodes 70 may be assigned to each client in any suitable manner. If the second client 12 later begins sending query requests 54 to system 14 for processing by the threads assigned to the second client 12, at least the threads being used by the second client 12 may then be given adequate CPU cycles for processing the query requests 54 submitted by the second client 12. Furthermore, in certain embodiments, query receiving module 60 may be operable to communicate query requests 54 to appropriate one or more appropriate master nodes 70 according to the above-described techniques. Moreover, the techniques for managing the threads of a master node 70 may help system 14 to manage throughput in processing of query requests 54 received from one or more clients 12. As used throughout this description, managing throughput may include increasing throughput, substantially maximizing throughput, holding throughput substantially constant, decreasing throughput, or substantially minimizing throughput; however, it may be desirable to increase throughput to the fullest extent possible.

Upon receiving a query request 54 (e.g., from query receiving module 60 or otherwise), a master node 70 may process query request 54 to determine if query request 54 corresponds to one of precompiled queries $24_1$-$24_W$. If a query request 54 does not correspond to one of precompiled queries $24_1$-$24_W$, master node 70 may, in certain embodiments, initiate dynamic creation of one or more keys parts 42 for resolving query 22. If query request 54 does correspond to one or more of precompiled queries $24_1$-$24_W$, master node 70 is operable to initiate processing of the one or more corresponding precompiled queries 32.

A receiving master node 70 may review the annotated query execution graph corresponding to the corresponding precompiled query 24 to determine if one or more activities in the query execution graph require a remote activity (i.e., an activity for processing at one or more of slave nodes $72_1$-$72_M$). In some cases, master node 70 determines whether the annotated query execution graph calls for one or more remote activities by reviewing the activity IDs assigned to each activity for the corresponding precompiled query 24. If the corresponding precompiled query 24 does not require any remote activities, master node 70 may process each activity of the query execution graph for the corresponding precompiled query 24. If the corresponding precompiled query 24 requires one or more remote activities, master node 70 is operable to communicate a portion of the corresponding precompiled query 24, such as the remote activity, along with any other suitable information, such as one or more input variables specified in query request 54, to one or more slave nodes $72_1$-$72_M$ for processing. The remote activity may include, for example, an index read, a record read, an aggregation, or any other activity that necessitates the use of one or more slave nodes $72_1$-$72_M$.

Master node 70 is operable to determine the appropriate one or more slave nodes 72 for handling the remote activity of the corresponding precompiled query 24. In certain embodiments, master node 70 may not actually determine the one or more slave nodes 72 for handling the remote activity, but may instead determine one or more appropriate communication channels on which to communicate the remote activity. For example, master node 70 may read the annotated query execution graph associated with the corresponding precompiled query 24 to determine whether the corresponding precompiled query 24 calls for an index read or other suitable activity of at least one key part 30. To determine the appropriate communication channel that has access to the necessary data for resolving the query request 54, master node 70 accesses the appropriate top level key 32 associated with corresponding precompiled query 24 to determine the one or more key parts 30 that may be needed to resolve at least a portion of query request 54. Master node 70 may map the location of one or more particular key parts 30 to one or more communication channels using, for example, the "part_no MOD num_channels" function described above. In this example, master node 70 accesses the appropriate top level key 32, retrieves the identification of the one or more appropriate key parts 30, maps the one or more appropriate key parts 30 to one or more communication channels, and communicates one or more requests for an index read (or other suitable activity) of the one or more particular key parts 30.

In certain embodiments, each master node 70 is capable of communicating one or more requests to perform a particular one or more activities associated with corresponding precompiled query 24 for processing by one or more slave nodes $72_1$-$72_M$. The requests communicated by master nodes 70 may each comprise a request package. Each request package may include the one or more input variables supplied in query requests 54. For example, the one or more input variables of query request 54 may include one or more of first name, last name, and social security number. As another example, the one or more input variables of query request 54 may include one or more of make, model, year, and color of one or more vehicles. Each request package may also include an activity ID identifying the particular activity (e.g., an index read) that the master node 70 is requesting the one or more slave nodes 72 to perform. For example, the activity ID may direct the one or more slave nodes 72 to particular locations within the DLL file. Although this description focuses primarily on embodiments, in which the requests communicated by master nodes 70 each comprises a request package, the present invention contemplates the requests comprising any suitable format, according to particular needs.

In certain embodiments, master node 70 assigns a transaction ID to the request package, so that when the one or more slave nodes 72 return results to master node 70, master node 70 will be able to match the returned results to the appropriate request package. Each request package may also include one or more of: (a) a master node identifier indicating which master node 70 sent the request package; (b) an indication of the communication channel on which master node 70 communicated the respective request package; and (c) an indication of whether there have been any retries for the one or more activities associated with the request package. In certain embodiments, the master node identifier may include the Internet protocol (IP) address of the master node 70, which may be globally unique. In some cases, the master node identifier may be included as part of the transaction ID. Including master node identifiers in request packages may allow the slave nodes 72 that receive the request packages to know where to send the results obtained by the slave nodes 72. The request package may include any other suitable information or data, according to particular needs. Certain of the information in the request package may be included in a header portion of the request package. In certain embodiments, master node 70 generates the request packages using one or more helper files, such as one or more DLLs, accessible to master node 70.

In certain embodiments, the request package may include a priority identifier for identifying a priority of the request package. The priority identifier may be implemented in any suitable manner, according to particular needs, and the priority may be based on any suitable factors. As just one example, the priority may be a binary variable, where a value of zero indicates a low priority and a value of one indicates a high priority, or vice versa. The priority may be a user-specified priority in query request 54. Additionally or alternatively, the priority may be based on an identification of the client 12 that submitted the query request 54 associated with the request package. For example, certain clients 12 may be granted or assigned a higher priority than other clients 12, so that query requests 54 submitted by those clients 12 granted a higher priority tend to be processed more quickly by system 14 than query requests 54 submitted by those clients 12 granted a lower priority. Additionally or alternatively, the priority may be based on the type of query request 54 and/or the type of activities associated with the request package.

Each master node 70 may maintain one or more outgoing queues or other suitable data structures 82 for storing request packages until such request packages should be communicated to one or more of slave nodes 72 via one or more communication channels. For example, each master node 72 may maintain a separate outgoing queue 82 for each communication channel of network 80, a single outgoing queue 82 for all communication channels of network 80, or any other suitable number of outgoing queues 82. Master nodes 70 may communicate request packages from their respective outgoing queues 82 at random, in a first-in-first-out manner, or in any other suitable manner.

In certain embodiments, master node 70 communicates the portion of precompiled query 24 to be processed by one or more slave nodes $72_1$-$72_M$ using a multicast signal formatted in, for example, UDP. For example, master node 70 may communicate the request package to one or more slave nodes $72_1$-$72_M$ using a multicast signal. Master node may communicate the multicast signal on the one or more appropriate communication channels determined by reading the annotated query execution graph and top level key 32, as described above. For example, master node 70 communicates one or more multicast signals on one or more appropriate communication channels, and such multicast signals may be received by some or all of slave nodes $72_1$-$72_{40}$ capable of receiving signals on the one or more communication channels on which the multicast signal was communicated. In general, a multicast signal is received by any slave node 72 registered to receive multicast signals communicated on a particular communication channel. As an example, master node 70 communicates a request package on communication channel eleven, and one or more slave nodes 72 having registered to receive communications sent on channel eleven receive the request package.

Use of multicast signals may allow master nodes 70 to communicate a single request to multiple slave nodes 72 registered on a single channel rather than requiring master node 70 to communicate a separate request package to each of slave nodes 72 having access to the appropriate key parts 30, which may reduce the outgoing communication bandwidth required for master node 70 to communicate request packages and may reduce the processing required of master node 70. Furthermore, because in certain embodiments multiple slave nodes 72 have access to the same key parts 30, multiple slave nodes 72 may be registered on a single communication channel, which may provide additional reliability in system 14.

Upon receiving a request package from a master node 70, a slave node 72 may perform some initial processing on the request package. For example, each slave node may maintain one or more incoming queues or other suitable data structures 84 for inserting incoming request packages. In certain embodiments, the one or more incoming queues 84 may be implemented as a circular buffer. Each slave nodes 72 may retrieve request packages for processing from their corresponding incoming queues 84 in any suitable manner according to particular needs. For example, slave nodes 72 may retrieve request packages from their respective incoming queues 84 at random, in a pseudo-random manner, in a first-in-first-out manner, or in any other suitable manner.

In certain embodiments, the request packages may be associated with a priority, as described above. In such embodiments, slave nodes 72 may consider the priority of the request when inserting the request in the incoming queue 84 of the slave node 72. For example, the slave node 72 may simply inspect the priority identifier in the request package, and if the priority identifier indicates that the request package has a high priority, then the slave node 72 may insert the request package at the head or substantially at the head of its incoming queue 84.

Additionally or alternatively, each slave node 72 may maintain separate incoming queues 84, one incoming queue 84 being for high priority requests and one incoming queue 84 being for low priority requests. In certain embodiments, each slave node 72 may select a request for processing from its high priority incoming queue 84 before or more frequently than selecting a request for processing from its low priority incoming queue 84. Although two incoming queues 84 are described (one for high priority requests and one for low priority requests), the present invention contemplates each slave node 72 maintaining a number of incoming queues 84, each corresponding to one of a number of degrees of priority (e.g., high priority, medium priority, and low priority). Prioritizing requests received from master nodes 70 may enable may help system 14 to manage throughput in processing of query requests 54 received from one or more clients 12. In particular embodiments, prioritizing requests may help system 14 to increase or maximize throughput for query requests 54 of higher importance or priority.

In embodiments in which more than one slave node 72 is registered on a communication channel on which a master node 70 communicates a request to perform one or more activities (e.g., in a request package), more than one of the slave nodes 72 may receive the request communicated by the master node 70. For example, more than one of the slave nodes 72 may retrieve the request package from their respective incoming queues 84 to perform the one or more activities associated with the request. In some cases, it may be desirable it may be desirable to reduce or eliminate the possibility that more than one slave node 72 will handle the request communicated by the master node 70.

In certain embodiments, upon retrieving a request from queue 84 to perform the one or more activities associated with the request, slave nodes 72 are operable to communicate a notification or other suitable message 85 on the communication channel on which the request was received. In general, notification 85 is operable to notify one or more other slave nodes 72 on the same communication channel as the slave node 72 that is sending notification 85 (and presumably the same communication channel on which the request was communicated by the master node 70) that the slave node 72 that sent notification 85 is handling the request.

Notification 85 may comprise any suitable format and include any suitable information, according to particular needs. In certain embodiments, notification 85 includes one or more of the transaction ID associated with the request package, one or more activity IDs included in the request package, or any other suitable information. For example, notification 85 may include substantially similar information as was included in the request package for which the slave node 72 is claiming responsibility.

In a particular non-limiting example, ten communication channels are used and slave nodes $72_3$ and $72_{43}$ each have access to key part $30_3$ and are registered to receive communications sent on the third communication channel. Although particular slave nodes 72 are described for purposes of this example, any or all of slave nodes 72 may be capable of performing similar functionality. Suppose master node $70_1$ communicates a request package on the third communication channel (e.g., using a multicast signal) and that the activity associated with the request comprises an index read of key part $30_3$. Suppose also for purposes of this example that both slave nodes $72_3$ and $72_{43}$ receive the request package and insert the request in their respective incoming queues 84. Typically, either slave node $72_3$ or slave node $72_{43}$ may fulfill this request by performing the index read of key part $30_3$. Suppose slave node $72_3$ retrieves the request from its incoming queue 84 to perform the activity associated with the request. In this example, slave node $72_3$ communicates a notification 85 on the third communication channel. Slave node $72_{43}$ will receive the notification 85 and will know that it does not need to fulfill the request because slave node $72_3$ is already doing so. In certain embodiments, slave node $72_{43}$ will remove the request from its incoming queue 85 or otherwise flag the request as being processed by another slave node 72.

In certain embodiments, it may be possible for both slave node $72_3$ and slave node $72_{43}$ to begin processing the request at substantially the same time or otherwise prior to receiving a notification 85 from the other slave node 72. In some cases, it may be desirable for one of slave nodes $72_3$ and $72_{43}$ to stop processing the request. In such embodiments, both slave nodes $72_3$ and $72_{43}$ may send a notification on the third communication channel and each of slave nodes $72_3$ and $72_{43}$ may receive the notification 85 communicated by the other slave node. In certain embodiments, slave nodes $72_3$ and $72_{43}$ are able to arbitrate between themselves (or among themselves if more than two slave nodes 72 are involved) as to which will stop processing the request and which will continue processing the request.

For example, in certain embodiments, the arbitration may be determined based on a relative priority between or among the slave nodes 72 registered with the same channel. The priority may be determined in any suitable manner, according to particular needs. In certain embodiments, a relative priority is assigned to each of the slave nodes 72 operating on the same channel. In other embodiments, the relative priority may be based on the IP address for each slave node 72, such that a slave node 72 with a higher IP address "wins" the arbitration. In yet other embodiments, the relative priority may be calculated according to an algorithm. As just one example, the algorithm may be based in part on the Internet protocol (IP address) assigned to each slave node 72 and one or more other suitable variables such as the activity ID associated with an activity in the request communicated by the master node 70. The use of an algorithm may be desirable because the algorithm may reduce or eliminate the chances that the same slave node 72 always or substantially always "wins" the arbitration.

In certain embodiments, the slave node 72 that "wins" the arbitration will continue handling the request communicated by the master node 70, while the one or more slave nodes 72 that "lose" the arbitration will cease processing the request. The one or more slave nodes 72 that "lose" the arbitration may also remove the request from their respective incoming queues 84.

Other techniques may be used to reduce or eliminate the possibility that more than one slave node 72 will handle a request communicated by a master node 70. In certain embodiments, slave nodes 72 may retrieve requests in their respective incoming queues 84 in a somewhat random fashion. For example, slave nodes 72 may randomly or pseudo-randomly select one of a first predetermined number of requests in their respective incoming queues 84 for processing. As a particular example, slave nodes 72 may select one of the first ten requests in their respective incoming queues 84 for processing. This may reduce the chances that more than one slave node 72 on the same communication channel will select the same request from their respective incoming queues 84 to process.

Although in this example, the predetermined number' is ten, the predetermined number may be any suitable number, according to particular needs. Additionally, although the predetermined number is described as being from the first positions in incoming queue 84, the predetermined number may be at any suitable position in the incoming queue 84. For example, slave nodes 72 may select one of the middle twenty entries in their respective incoming queues 84, one of the last fifteen entries in their respective incoming queues 84, or in any other suitable manner. It may be desirable, in some embodiments, to select from the first positions in the incoming queue 84 so that the requests are processed at least somewhat in the order in which they were received.

Upon retrieving a request package, from incoming queue 84 for example, a slave node 72 may determine one or more activities associated with the request package. For example, slave node 72 may determine the one or more activities associated with the request package by reading the one or more activity IDs specified in the request package. In this particular example, the received request package specifies a single activity ID indicating that the activity is an index read. Slave node 72 may use one or more helper files to determine a portion of one or more DLLs to access to perform the activity associated with the activity ID. Slave node may use the one or more variables specified in the request package (e.g., the one or more variables provided in query request 54) to perform the activity associated with the activity ID. For example, slave node 72 may execute the portion of the one or more DLLs, using the one or more variables of the request package, to perform the activity (e.g., an index read). In one example, the one or more variables include one or more of a first name, a last name, and a social security number. In this example, slave node 72 accesses the appropriate key part 30 to resolve the activities associated with the request package using the one or more variables as input, which, in this example, includes retrieving one or more addresses associated with the one or more input variables.

After performing the appropriate action and retrieving or otherwise obtaining and/or assimilating the appropriate results, slave node 72 may initiate return of the results for the request package to one or more of master nodes 70. Slave nodes 72 may return results to appropriate master nodes 70 in any suitable manner, according to particular needs. In certain embodiments, each slave node 72 maintains one or more outgoing queues 86. In such embodiments, a slave node 72 may insert the retrieved results into an outgoing queue 86 for storing such results. The results may be stored as one or more result packages. For example, the number of result packages may depend on the quantity of results to be returned. The result packages in a single outgoing queue 86 may provide results for a single request from a single master node 70, provide results for different requests from the same master node 70, or provide results for different requests received from different master nodes 70, according to particular needs. In certain embodiments, each slave node 72 may maintain a different outgoing queue 86 for results intended for each master node 70; however, this is not required in all embodiments. Each result package may include the transaction ID included in the request package to which the results correspond, so that the receiving master node 70 can determine to which request the result package corresponds.

Typically, slave nodes 72 return results for a request received from a master node 70 to the same master node 70 that communicated the request. Slave nodes 72 may determine the appropriate master node 70 to which to communicate results based on a master node identifier (which may be a part of the transaction ID of the results package) in the request package communicated by the master node 70. In certain embodiments, slave nodes 72 may substantially immediately return obtained results to the master node 70. For example, slave nodes 72 may return results as those results are obtained (e.g., in a first-in, first-out manner).

In other embodiments, it may be desirable for master nodes 70 to substantially control when the slave nodes 72 may return results to appropriate master nodes 70. For example, each slave node 72 may insert its results (e.g., as result packages) into its respective outgoing queue 86 and wait to send the results to the appropriate master node 70 until the slave node 72 receives a permission-to-send message from the appropriate master node 70. In such embodiments, after obtaining results responsive to a request communicated by a particular master node 70, a slave node 72 may communicate a message on a dedicated flow control channel, indicating that slave node 72 has results to return to the particular master node 70. This message may be referred to as a request-to-send message, and may be multicast, broadcast, or uni-cast. In certain embodiments, the dedicated flow control channel may be a separate port from the other communication channels, the separate port being used by any or all of master nodes 70 and slave nodes 72 to communicate data flow control messages.

In a particular example, a transport mechanism for handling the communication of results from one or more slave nodes 72 to one or more master nodes 70 includes a high level layer and a low level transport protocol. The high level layer may be responsible for the unique identifiers associated with each communicated message (e.g., the transaction ID associated with the message). The low-level transport protocol may include the unique identifiers (e.g., the transaction ID associated with the message), and one or more sequence numbers associated with the message. The high level layer may be responsible for reassembling messages. For example, data communicated to master nodes 72 may have been communicated from multiple slave nodes 72. Low-level messages from slave nodes 72 may that include the same unique identifier and the same low-level sequence number may be associated with the same request to perform one or more activities (e.g., when a request communicated by a master node 70 involves multiple slave nodes 72 searching multiple key parts 30). For example, either of the unique identifier or the low-level sequence number associated with result packages communicated by slave nodes 72 may allow the receiving master node 70 to reconstruct an appropriate order of the result packages, since the result packages may not be received at the same time or sequentially by the master node 70. The request-to-send and permission-to-send messages may be a part of the low-level transport layer as described below.

The master node 70 that sent the request package may, in response to the request-to-send message, communicate a permission-to-send message to the slave node 72 indicating that the slave node 72 may communicate the results to the master node 70. As such, slave nodes 72 may not send results from their outgoing queues 86 in a first-in, first-out manner, in certain embodiments, but may instead send results for which they have received a permission-to-send message, wherever those results may be in outgoing queue 86.

In certain embodiments, as a master node 70 receives request-to-send messages from one or more slave nodes 72, it may store those request-to-send messages in a queue or other suitable data structure 87. When the master node 70 is not busy receiving data (e.g., result data from slave nodes 72 as opposed to flow control data, in certain embodiments), the master node 70 may access queue 87, and select a request-to-send message from queue 87. For example, the master node 70 may select the request-to-send messages from queue 87 in a first-in, first-out manner. The master node 72 may, prior to sending a permission-to-send message for the slave node 72 associated with the selected request-to-send message, determine whether the slave node 72 is available to send the results. For example, the slave node 72 may already be busy sending other results to another master node 70. Thus, when a master node 70 receives a request-to-send message from the particular slave node 72, it may be desirable to first determine whether the particular slave node 72 is already busy sending results to another master node 70. This may allow the master node 70 to determine, by accessing queue 87 for example, whether any other slave nodes 72 for which the master node 70 has outstanding request-to-send messages are available to send results to the master node 70, rather than to wait for the particular slave node 72 to finish sending its certain of its results to the one or more other master nodes 70.

Once a master node 70 determines that a particular slave node 72 is available to send results to the master node 70, the master node 70 may send a permission-to-send message to the particular slave node 72. In some cases, if the master node 70 determines that all slave nodes 72 corresponding to request-to-send messages in queue 87 of the master node 70, then master node 70 may communicate the permission-to-send message to any suitable slave node 72 corresponding to a request-to-send message in queue 87 (e.g., the slave node 72 corresponding to the first request-to-send message in queue 87).

In certain embodiments, the permission-to-send message may include information regarding how much data the particular slave node 72 is allowed to send to the master node 70, which may be based on how much buffer or queue space is available on the master node for receiving results from slave nodes 72. Additionally, a predefined maximum amount of data may exist, which may limit the amount of data that a master node 70 can allow a slave node 72 to send to the master node 70 at substantially one time. Each permission-to-send message may include any other suitable information, according to particular needs. In certain embodiments, a particular communication channel may be dedicated as a flow-control channel on which these messages may be sent, each master node 70 being operable to listen on the flow-control channel to determine which slave nodes 72 are currently busy.

In response to receiving a permission-to-send message, at least a portion of the result data for the master node 70 may be communicated to the master node 70. For example, the slave node 72 may communicate the results as a uni-cast message addressed to the particular master node 70. The slave node 72 may know the identity of the particular master node 70 based on the request package associated to which the results correspond. For example, the transaction ID and/or the master node identifier in the request package may be used by the slave node 72 to determine the identity of the particular master node 70.

In certain embodiments, the total data in output queue 86 (which may or may not be specific to the master node 70) may be broken into packages, which may be smaller than a maximum transmission unit (MTU) of the network on which the data is to be sent. If there is more than one output queue 86 associated with the master node 70, then data may be taken from each output queue 86 in a round-robin or other suitable manner, and sent to the master node 70. The slave node 72 may communicate results as one or more result packages, which may include one or more of the retrieved results. Each result package may include at least the transaction ID specified in the request package to which the retrieved results correspond and any other suitable information, according to particular needs. The transaction ID may be used by the master node 70 that receives the result package to match up the result package with the appropriate request. This may assist the master nodes 70 in identifying which requests are still outstanding.

In certain embodiments, once a slave node 72 has sent an allotted amount of data to the master node 70 (e.g., the amount specified in the permission-to-send message, if the slave has that much data to send), the slave node 72 may communicate a sending-complete message. The sending-complete message may be communicated over the flow control channel, so that each master node may be made aware that the slave node 72 is no longer tied up sending data to the master node 70. If the slave node 72 has additional data to send to the master node 70, the slave node 72 may communicate another request-to-send message to the master node 70.

In certain embodiments, each time a slave node 72 begins to send information to a master node 70, the slave node 72 may send a multicast message indicating that the slave node 72 is busy sending data to the master node 70. This multicast message may be received by any or all the master nodes 70, so that the master nodes 70 can know that the slave node 70 is busy sending data. In certain embodiments, when the slave node 72 is finished sending data to the master node 70, the slave node 72 may send another multicast signal indicating that the slave node 72 is now free to send data. Alternatively, each permission-to-send message may be associated with a predefined time limit such that after the predefined time limit has passed, the slave node 72 to which the permission-to-send message was sent may be automatically released by the master node 70 and free to send messages to other master nodes 70.

In a particular example, if a slave node 72 receives a permission-to-send message from a first master node 70 and the slave node 72 is already busy sending data to a second master node 70, the slave node 72 may terminate sending data to the second master node 70 and begin sending data to the first master node 70.

It may be possible for flow control messages (e.g., request-to-send messages or permission-to-send messages) to be lost and fail to arrive at their intended destinations. In certain embodiments, a predefined time limit may be associated with each flow control message such that if a slave node 72 does not receive a permission-to-send message in response to a request-to-send message within the predefined time limit, the slave node 72 may resend the request-to-send message. Furthermore, if a master node 70 does not receive a complete message in response to sending a permission-to-send message, then the master node 70 may reinsert the request-to-send message (i.e. for which the incomplete results were sent) into queue 87 (e.g., at the end of queue 87) to be retried at a later time. The time limit for the completed messages may be dynamically determined based on the amount of data allotted to the slave node 72 in the permission-to-send message. For example, when a master node 70 indicates in the permission-to-send message that a slave node 72 may send a large amount of data, the time limit may be longer than when a master node 70 indicates in the permission-to-send message that a slave node 72 may send a smaller amount of data.

In practice, master nodes 70 may each be handling a large number of query requests 54 received from one or more clients 12, during heavy use of system 14 for example. Additionally, a master node 70 may be handling a query request 54 that invokes a complex precompiled query 24 that requires a master node 70 to communicate a large quantity of requests to one or more slave nodes 72 (e.g., via multicast signals communicated on one or more communication channels). Furthermore, a master node 70 may communicate a request to one or more slave nodes 72 that may require the slave nodes 72 to return a large quantity of results, as separate result packages for example. Thus, there may be multiple requests being processed by multiple slave nodes 72 in parallel for each master node 70. Furthermore, a particular request may involve multiple index reads or an index read of multiple key parts 30, which may or may not involve multiple slave nodes 72. For these and other reasons, each master node 70 may have multiple requests being processed by multiple slave nodes 72, and in certain embodiments, it may be desirable for each master node 70 to received results from the first available slave node 72 rather than waiting to receive those results in a particular order.

The above-described techniques may assist the master node 70 in managing the return of those results, particularly in such complex situations. For example, by frequently checking queue 87, a master node 70 may keep track of whether the master node 70 has received a request-to-send for each of those requests, and once the master node 70 communicates a permission-to-send to a slave node 72 and actually receives the results from the slave node 72, the master node 70 may mark the request to which those results are responsive of the list of outstanding requests (assuming there are no other slave nodes 72 returning results for that request). In certain embodiments, a master node 70 may be operable to pause the sending of requests to slave nodes 72 if the master node 70 currently has too many outstanding requests for which results have not been returned.

In certain embodiments, slave nodes 72 may be configured to send only a certain number of results. For example, a particular slave node 72 may receive a request (e.g., a request package) from a master node 70, requesting that all persons an index read for all persons having the first name Richard. Such a request may result in a large number of results. Assume for purposes of this example that the particular slave node 72 finds one thousand data entries for people having the first name Richard. Also, assume for purposes of this example only that each slave node 72 is configured to send no more than one hundred results at a time. Although described as a particular number of results in this example, each slave node 72 may be configured to only send a particular amount of data, such as ten thousand kilobytes for example.

In certain embodiments, the particular slave node 72 may communicate the first one hundred results and may notify the particular master node 70, in the result package that includes the first one hundred results for example, that more results are available. The result package may also include sufficient information to allow the particular master node 70 to send out another request for more of the found results (i.e., the next one hundred results in the one thousand found results), and to inform allow the slave node 72 that receives the next request to start where the previously returned results left off. This may include, for example, in indication of a location within the key part 30 for resolving the request from the particular master node 70 where the particular slave node 72 stopped returning results. In certain embodiments, the particular master node 70 may send the next request for the next one hundred results to the same or a different slave node 70.

Master nodes 70 may receive returned results from slaves nodes 72, as result packages for example. In certain embodiments, master nodes 70 maintain one or more incoming queues or other suitable data structures 88 for inserting retrieved results that are returned from slave nodes 72. For example, each master node 70 may maintain separate incoming queues 88 for each request that the master node 70 communicated. Alternatively, each master node may maintain a single incoming queue 88 for all results. Master nodes 70 may match up the result package with the request package based on the transaction ID specified in both the result package and the request package. Additionally, if a master node 70 receives duplicate results from one or more slave nodes 72 (e.g., if two slaves process the request communicated by the master node 70 and both return the same results for the request), master node 70 may be operable to discard one of the duplicates. Master node 70 may assimilate the results in any suitable manner, according to particular needs.

In certain embodiments, master node 70 may need to perform additional processing on the results received from one or more slave nodes 72, based on the annotated query execution graph associated with the precompiled query 24 for which the results were retrieved. For example, master node 70 may perform one or more local activities such as a sort, a de-duplication, and/or a roll-up of the returned results. While these activities are provided as examples of local activities, the present invention contemplates these activities being remote activities, performed by one or more of slaves 72 for example. Master node 70 may perform any other suitable processing on the returned results, according to particular needs. For example, the annotated query execution graph may indicate that another request package should be sent out based on the results received from slave nodes 72.

In certain embodiments, master node 70 receives results corresponding to a particular precompiled query 24 from more than one slave node 72 operating on one or more communication channels of network 80. In such embodiments, master node 70 may assimilate the results received from each of the slave nodes 72 responsive to the same query request 54. For example, master node 70 may assimilate the results by using the transaction ID in the return packages for the results to determine which results are responsive to the same query request 54.

Master nodes 70 may initiate communication of the results to the client 12 that submitted the query request 54 corresponding to the results. The results may be communicated to client 12 in any suitable manner, according to particular needs. For example, the results may be communicated to client 12 in a manner that bypasses query receiving module 60. The results may comprise any suitable format, according to particular needs, such as XML or HTML. The results may be communicated to client 12 in a single communication or in multiple communications. These results may be displayed on client 12 (e.g., on GUI 52 of client system 12) in any suitable manner, according to particular needs.

FIG. 3 illustrates an example query execution graph 100 associated with an example precompiled query 24. FIG. 3 illustrates just one example embodiment of a query execution graph. It should be appreciated that other embodiments of a query execution graph may be used without departing from the scope of the present invention. In this example, query execution graph 100 includes five activities 102-110. Although query execution graph 100 includes five activities 102-110 in this example, query execution graph 100 could include any other number of activities without departing from the scope of the present invention.

In certain embodiments, query execution graph 100 includes activities 102-106, each capable of providing one or more desired responses or ranges of responses upon receiving a set of input variables (e.g., specified in a query request 54). Activities 102-106 may include, for example, remote activities, local activities, and/or a combination of remote and local activities. As used throughout this document, the term "remote activity" or "remote activities" refers to a particular activity within a precompiled query that calls for the execution of at least a portion of that activity on one or more slave nodes. A "local activity" is a particular activity within a precompiled query that is executed on the master node processing the precompiled query.

In this particular embodiment, each of activities 102-106 includes one or more remote activities, such as, for example, one or more index reads, one or more record reads, one or more aggregations, or any other activity that necessitates the use of one or more slave nodes. Moreover, each of activities 102-106 has access to one or more associated DLLs and/or helper files capable of assisting a master node 70 or slave node 72 in processing the one or more remote activities associated with activities 102-106.

In this example, activities 108-110 include one or more local activities, such as, for example, one or more sorts, one or more de-duplications, one or more roll ups, or any other activity capable of being performed on the master node that received the request (e.g., query request 54). Each of activities 108-110 has access to one or more associated DLLs and/or helper files capable of assisting a master node 70 in processing the one or more local activities associated with activities 108-110.

In one non-limiting example, query execution graph 100 illustrates a precompiled query capable of returning one or more desired addresses or range of addresses when any combination of one or more first names, one or more last names, or one or more social security numbers are provided by a user of a database system, such as system 14 of FIGS. 1 and 2 (e.g., as part of a query request 54). In that example, activity 102 is capable of returning one or more desired addresses when a user inputs a first name and last name, while activity 104 is capable of returning one or more desired addresses when a user inputs a range social security number. Moreover, activity 106 is capable of returning one or more desired addresses when a user inputs one or more last names.

In that example, activity 108 operates to determine which inputs have been provided by the user and to select an appropriate one of activities 102-106 to resolve the user's request. In various embodiments, activity 108 includes or has access to logic that enables activity 108 to determine the best activity 102-106 to use in resolving the user's request. In some cases, activity 108 can include logic that determines the probability of each activity 102-106 returning the desired address based on the inputs and selects the activity with the highest probability. For example, the logic could indicate that when a social security number and a last name are provided, implementing activity 104 is most likely to return the desired address. In this example, activity 110 operates to provide an output signal that includes the desired address to the user.

FIG. 4 illustrates an example sorted table 200 that includes a plurality of key parts 224. FIG. 4 illustrates just one example embodiment of a sorted table. It should be appreciated that other embodiments of a sorted table may be used without departing from the scope of the present invention. In this example, sorted table 200 includes four fields 202-208. Although sorted table 200 include four fields 202-208 in this example, sorted table 200 could include any other number of fields without departing from the scope of the present disclosure.

In one non-limiting example, sorted table 200 is sorted by first field 202, which includes a name first name for a plurality of data entries. Sorted table 200 is then sorted by second field 204, which includes a last name that is associated with the first name of the respective data entry. Finally, sorted table 200 is sorted by third field 206, which includes an address associated with the respective entry. Fourth field 208 may include any data entry identifier 208, such as, for example, the position of the data entry within the sorted database, a pointer to the location of additional data, or any other appropriate data entry identifier. In other embodiments, third field 206 may include a pointer to the location of the desired address that is stored in another table.

Fields 202-206 of sorted table 200 may be populated with data generated by and/or stored on a database system, such as second database system 40 of FIG. 1. In this particular example, fields 202-206 are populated with data sorted on a database system after receiving a request to generate a sorted table for use in resolving at least a portion of a precompiled query. In that example, the precompiled query is capable of returning one or more desired addresses when a first name and last name are provided to a database system, such as first database system 14 of FIGS. 1 and 2.

In most cases, the one or more sorts of data result in sorted table 200 being distributed over one or more of second nodes $44_1$-$44_N$ as key parts $224_A$-$224_N$. In this particular example, first key part $224_A$ includes the addresses for names ranging from Aaron Aaskey to Chad Thomas, second key part $224_B$ includes the addresses for the names ranging from Chad Tomas to Connor McConnell, and last key part $224_N$ includes addresses for the names Yen Lee to Zack Zymol.

In this particular example, after key part $224_A$-$224_N$ are populated with data generated by and/or stored on a database, each of key parts $224_A$-$224_N$ is communicated to another database system, such as database system 14 of FIGS. 1 and 2, for use in resolving a request to execute a precompiled query. In some cases, a particular precompiled query can use sorted table 200 to identify one or more addresses for all persons having the first name Chad and that have a last name that is phonetically similar to Thomas. In that case, the particular precompiled query uses key parts $224_A$ and $224_B$ to identify the addresses of at least Chad Thomas and Chad Tomas.

FIG. 5 illustrates an example top level key 324 associated with a sorted table. FIG. 5 illustrates just one example embodiment of a top level key associated with a sorted table, such as table 200 of FIG. 4. It should be appreciated that other embodiments of a top level key may be used without departing from the scope of the present disclosure. In this example, top level key 324 includes four fields 302-308. Although top level key 324 includes four fields 302-308 in this example, top level key 324 could include any other number of fields without departing from the scope of the present disclosure.

In one non-limiting example, a database system, such as second database system 40 of FIG. 1, generates top level key 324. Top level key 324 includes a first field 302, which includes a first name for a plurality of data entries. Second field 304 includes a last name that is associated with the first name of the respective data entry; while third field 306 includes an address associated with the respective entry. Fourth field 308 can include any key part location identifier, such as, for example, the identification of the respective node, such as node 44 of FIG. 1, that stores the key part.

In this example, top level key 324 operates to identify the location within a database system of each key part associated with a sorted table. In this 15 particular example, fields 302-306 are populated with data from the sorted table for use with a particular precompiled query of a database system, such as first database system 14 of FIGS. 1 and 2. In that example, the particular precompiled query is capable of returning one or more desired address when one or more first names and one or more last names are provided to the a database system.

In this example, fields 302-306 of top level key 324 identify the last data entry of a particular key part, such as key parts $224_A$-$224_N$ of FIG. 4, associated with a sorted table. Fourth field 308 identifies the location of the last data entry for the particular key part, such as a particular second node 44 of FIG. 1. For example, top level key 324 can be used to identify that all the names following Chad Thomas up to and including Connor McConnell are located on node $44_2$ of second database system 40 of FIG. 1. Consequently, top level key 324 identifies the location of each data entry within a sorted table.

In this particular example, after top level key 324 is created, top level key 324 is communicated to another database system, such as database system 14 of FIGS. 1 and 2, for use in resolving a request to execute a precompiled query. In some cases, a particular precompiled query can use top level key 324 to identify the location of one or more key parts within a database system. In this example, the database system operates to map the location of each key part from its respective second node 44 to one or more communication channels associated with the database system. In some cases, the database system may include or have access to one or more functions capable of mapping the location of the key parts to one or more channel numbers associated with the database system, such as, for example, the "part_no MOD num_channels" function described above.

Figure 6:
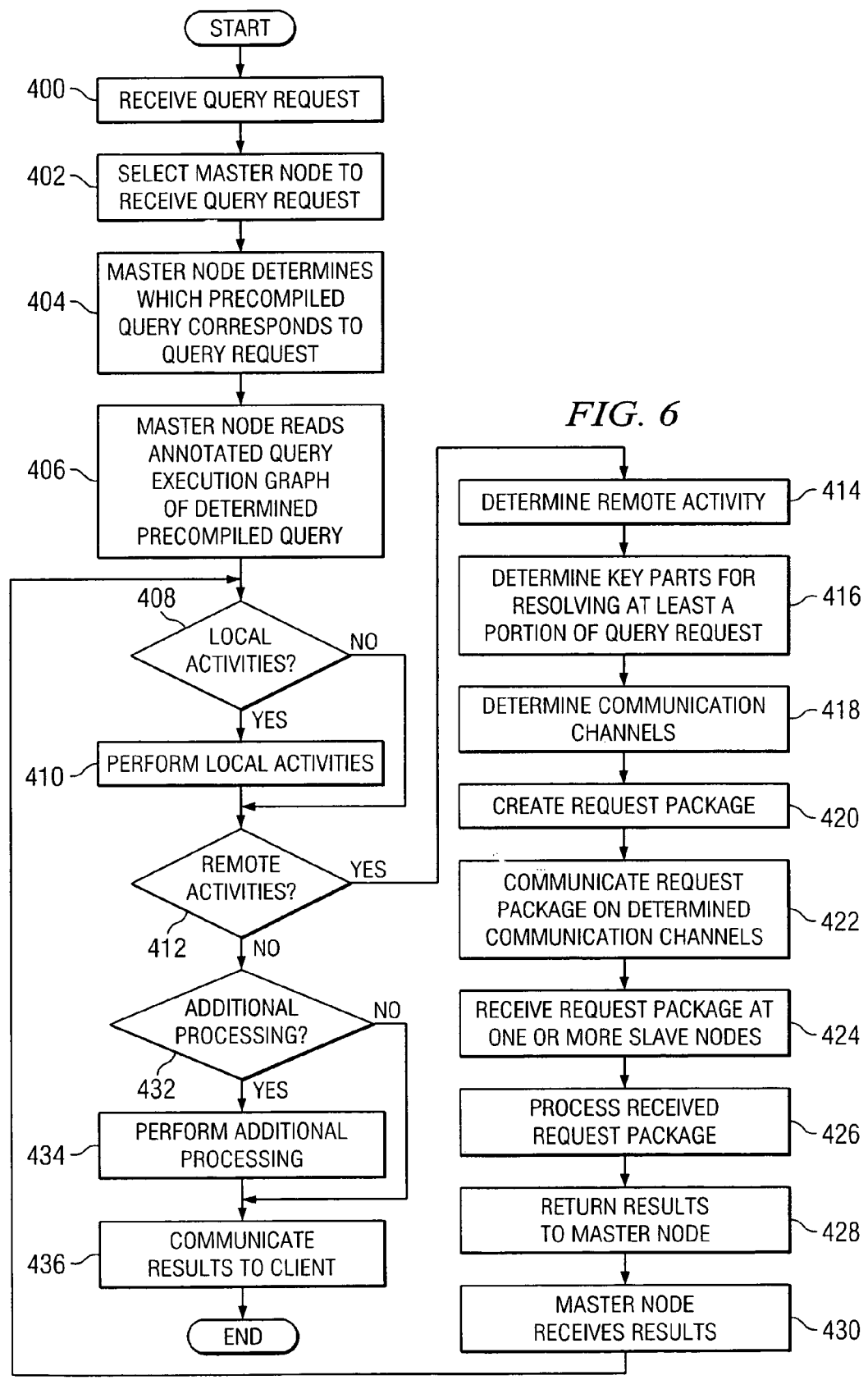
FIG. 6 illustrates an example method for processing one or more query requests in accordance with one embodiment of the present invention.

FIG. 6 illustrates an example method for processing one or more query requests 54 in accordance with one embodiment of the present invention. The method described with reference to FIG. 6 illustrates just one example method of processing queries in certain embodiments of the present invention. Moreover, in describing the method illustrated in FIG. 6, various example query requests 54 are described, which are for example purposes only and should not be used to limit the scope of the present invention.

Furthermore, for purposes of this example, it is assumed that first database system 14 includes one or more precompiled queries $24_1$-$24_W$, one or more top level keys $32_1$-$32_X$, and a plurality of key parts $30_1$-$30_N$ necessary to resolve precompiled queries $24_1$-$24_W$ deployed to nodes $20_1$-$20_M$. In this particular embodiment, system 14 stores each of precompiled queries $24_1$-$24_W$ on each of master nodes $70_1$-$70_M$ and slave nodes $72_1$-$72_M$. First database system 14 also executes one or more of precompiled queries $24_1$-$24_W$ upon receiving a query request 54 to execute a particular precompiled query 24 from a user of system 14. In some cases, the query request 54 to execute a particular precompiled query 54 can be received by first database system 14 from a client, such as client 12 of FIGS. 1 and 2. In various embodiments, a user can request execution of a particular precompiled query 54 by connecting to system 14 through any appropriate means, such as through a host coupled to system 14.

At step 400, system 14 receives a query request 54 from client 12. For example, a user of client system 12 may submit a query request 54, which may identify one or more input variables and a precompiled query 24 corresponding to the query request 54. For example, a user may desire to search for one or more addresses when any combination of first name, last name, and social security number are provided in query request 54 to system 10. Assuming that such a query is a precompiled query 24, the user may provide one or more of first name, last name, and social security number, along with an indication of the precompiled query 24 corresponding to the query request 54. Alternatively, if no precompiled query 24 corresponds to the query request 54, query request may identify one or more input variables and a desired output of the query request 54 without identifying a particular precompiled query 24 associated with the query request 54.

In one particular example, system 14 receives a plurality of query requests 54 from one or more users of system 14 to execute precompiled query $24_2$. In that example, precompiled query $24_2$ operates to return one or more desired addresses when any combination of one or more first names, one or more last names, and one or more social security numbers are provided in query request 54 to system 14.

In one particular non-limiting example, a first user of system 14 provides a first query request 54 that seeks to have precompiled query $24_2$ return one or more desired addresses for all persons named Chad Thomas. A second user of system 14 provides a second query request 54 that seeks to have precompiled query $24_2$ return a plurality of addresses for all the social security numbers within a particular range of numbers (e.g., from 111-22-3333 to 111-22-3417).

At step 402, one or more master nodes 70 are selected to receive the particular precompiled query 24 that resolves or otherwise corresponds to the user's query request 54. In most cases, system 14 selects only one of master nodes $70_1$-$70_M$ to receive query request 54 from the user and to execute the particular precompiled query 24 for resolving the user's query request 54. In certain embodiments, query receiving module 60 receives query request from client 12 via network 14. For example, in embodiments in which query receiving module 60 includes load balancing functionality, query receiving module 60 may initiate routing of query request 54 to one or more particular master nodes 70 based on any suitable load balancing technique for managing the load of query requests 54 that each master node 70 is handling. As described above with reference to FIG. 1, first database system 14 may be coupled to query receiving module 60 via a link 66, and query receiving module 60 may be separate from database system 14. Alternatively, query receiving module 60 may a part of system 14. In certain embodiments in which query receiving module 60 is separate from system 14, query receiving module 60 may receive query request 54 prior to system 14 receiving query request 54.

Additionally or alternatively, in certain embodiments, particular clients 12 may be pre-assigned to particular master nodes 70, and query requests 54 received from a client 12 may be routed to a corresponding pre-assigned master node 70 for the client 12. In yet other embodiments, query receiving module 60 may select which master node 70 will receive query requests 54 in a round-robin fashion. In yet other embodiments, query receiving module may select which master node 70 will receive query requests 54 in a random or pseudo-random fashion.

In one particular non-limiting example, master node $70_3$ is selected to receive and process the first query request 54 received from the first user, and master node $70_4$ is selected to receive and process the second query request 54 received from the second user. Although master nodes $70_3$ and $70_4$ are selected to receive and process the first and second query requests 54 in this example, any of master nodes $70_1$-$70_M$ could receive and process query requests 54 without departing from the scope of the present disclosure.

At step 404, master nodes $70_2$ and $70_3$ may process at least a portion of first and second query requests 54, respectively, to determine which, if any, of precompiled queries $34_1$-$34_W$ corresponds to first and second query requests 54. For example, query requests 54 may each include an indication their corresponding precompiled queries 24 (i.e., precompiled query $24_2$ in this example). If a query request 54 does not correspond to one of precompiled queries $24_1$-$24_W$, master node 70 may, in certain embodiments, initiate dynamic creation of one or more keys parts 42 for resolving query 22. In this particular example, master nodes $70_2$ and $70_3$ determine that both first query request 54 and second query request 54 are requests to execute precompiled query $24_2$.

At step 406, each of master nodes $70_2$ and $70_3$ reads the annotated query execution graph of precompiled query $24_2$. Based on the reading of the annotated query execution graph of precompiled query $24_2$, master nodes $70_2$ and $70_3$ determine whether there are any local activities associated with precompiled query$_2$ to be performed by master nodes $70_2$ and $70_3$, respectively, at step 408. For example, master nodes $70_2$ and $70_3$ may determine whether one or more local activities are to be performed prior to initiating performance of any remote activities. In some cases, master nodes $70_2$ and $70_3$ determine whether the annotated query execution graph calls for a local activity by the unique identification assigned to each activity (e.g., the activity IDs) for precompiled queries $24_2$ and $24_3$. In some embodiments, master nodes $202_3$ and $202_4$ determine that precompiled query $118_2$ can be fully executed on master nodes $202_3$ and $202_4$. If master nodes $70_2$ and $70_3$ determine that there are local activities to be performed, master nodes $70_2$ and $70_3$ perform those activities at step 410.

At step 412, master nodes $70_2$ and $70_3$ determine whether there are any remote activities (i.e. an activity for performance on one or more slave nodes 72) associated with precompiled query $24_2$ to be performed. In some cases, master nodes $70_2$ and $70_3$ determine whether the annotated query execution graph calls for a remote activity by the unique identification assigned to each activity (e.g., the activity IDs) for precompiled queries $24_2$ and $24_3$. If master nodes $70_2$ and $70_3$ determine that there are one or more, the method proceeds to step 414, described below. If master nodes $70_2$ and $70_3$ determine that there are no remote activities to be performed, then the method proceeds to step 432, described below.

In this particular embodiment, master nodes $70_2$ and $70_3$ determine that precompiled queries $24_2$ calls for one or more remote activities and the interaction of one or more of slave nodes $72_1$-$72_M$. The remote activities may include, for example, an index read, a record read, an aggregation, or any other activity that calls for the use of one or more slave nodes 72. In this example, each of master nodes $70_2$ and $70_3$ reads the annotated query execution graph associated with precompiled query $24_2$ and determines that precompiled query $24_2$ calls for an index read of at least one key part 30. At step 414, master nodes $70_2$ and $70_3$ determine the particular remote activities called for by the annotated query execution graph of precompiled query $24_2$. In this particular example, master node $202_3$ determines that an activity associated with resolving the first and second query requests 54 calls for an index read. Although the remote activity comprises an index read in this particular example, the present invention contemplates the remote activity comprising any suitable activities according to particular needs, and the subsequent steps of the method being modified in any suitable manner to handle those other remote activities.

At step 416, master nodes $70_2$ and $70_3$ determine one or more key parts 70 for resolving their respective query requests 54. For example, master nodes $70_2$ and $70_3$ may access the top level key associated with precompiled query $24_2$ to determine the one or more key parts 70 for resolving their respective query requests 54. In this particular example, master node $70_2$ determines that first query request 54 calls for an index read for all persons having the first name Chad and an index read for all the Chad's that have a last name that is phonetically similar to Thomas. Consequently, in this example, master node $70_2$ determines that precompiled query $24_2$ calls for index reads of key parts $30_{17}$ and $30_{18}$ to resolve the first query request 54. Meanwhile, master node $70_3$ determines that addresses associated with social security numbers between 111-22-3333 and 111-22-3385 are located in key part $30_{20}$ and that addresses associated with social security numbers between 111-22-3386 and 111-22-3417 are located on key part $30_{21}$. Thus, master node $70_3$ determines that precompiled query $24_2$ calls for index reads of key parts $30_{20}$ and $30_{21}$ to resolve the second query request 54.

At step 418, master nodes $70_2$ and $70_3$ determine one or more communication channels on which to send a request to perform the remote activity determined at step 414. In certain embodiments, master nodes $70_2$ and $70_3$ may map the one or more key parts determined at step 416 to one or more communication channels, using, for example, the "part_no MOD num_channels" function described above. In this particular example, to determine the appropriate communication channel for key parts $30_{17}$, $30_{18}$, $30_{20}$, and $30_3$, each of master nodes $70_2$ and $70_3$ performs the "part_no MOD num_channels" function described above. Each of master nodes $70_2$ and $70_3$ identifies the appropriate communication channels of the respective key parts 30. In this example, master node $70_2$ maps the location of key parts $30_{17}$ and $30_{18}$ to communication channels seventeen and eighteen, respectively. Master node $70_3$ maps the location of key parts $30_{20}$ and $30_{21}$ to communication channels twenty and twenty-one, respectively.

At step 420, each of master nodes $70_2$ and $70_3$ may create one or more request packages for communication on their respective determined communication channels. The request packages may include any suitable information or data, as described above with reference to FIG. 2. Typically, a request package will include at least an identification of a requested activity for at least one slave node 72 to perform, the one or more input variables or other parameters provided in query request 54, and a transaction ID identifying the particular instance of the request. Although formation and communication of request packages are described in this example, the present invention contemplates master nodes 70 requesting one or more slave nodes 72 to perform activities (e.g., index reads) in any suitable manner, according to particular needs.

At step 422, master nodes $70_2$ and $70_3$ communicate their respectively created request package via the determined one or more communication channels. In this example, master node $70_2$ communicates a request package that includes a request for one or more index reads of key parts $30_{17}$ and $30_{18}$ on each of communication channels seventeen and eighteen. Meanwhile, master node $70_3$ communicates a request package that includes a request for one or more index reads of key parts $30_{20}$ and $30_{21}$ on each of communication channels twenty and twenty-one. In this particular embodiment, each of master nodes $70_2$ and $70_3$ communicates the request packages using a multicast signal format. Each of master nodes $70_2$ and $70_3$ communicates the multicast signals to all of slave nodes $72_1$-$72_M$ that are capable of receiving signals on the appropriate communication channels (e.g., to all of slave nodes $72_1$-$72_M$ that have registered to receive signals on the appropriate communication channels).

At step 424, one or more slave nodes 72 that are capable of receiving signals on the appropriate one or more communication channels on which master nodes $70_2$ and $70_3$ communicated the request packages receives the request package. In certain embodiments, all of the slave nodes 72 capable of receiving signals on the appropriate one or more communication channels on which master nodes $70_2$ and $70_3$ communicated the request packages receive the request package.

In this example, slave nodes $72_6$ and $72_{16}$ operate to store and/or provide access to key part $30_{17}$, and slave nodes $72_2$ and $72_{16}$ operate to store and/or provide access to key part $30_{18}$. Moreover, slave nodes $72_6$ and $72_{16}$ are capable of receiving requests on communication channel seventeen, and slave nodes $72_2$ and $72_{16}$ are capable of receiving requests on communication channel eighteen. In this particular example, master node $70_3$ communicates one or more requests in one or more multicast signals on communication channel seventeen to each of slave nodes $72_6$ and $72_{16}$ and on communication channel eighteen to each of slave nodes $72_2$ and $72_{16}$.

Also in this example, slave nodes $72_1$ and $72_{11}$ operate to store and/or provide access to key part $30_{20}$, and slave nodes $72_{22}$ and $72_{34}$ operate to store and/or provide access to key part $30_{21}$. Moreover, slave nodes $72_1$ and $72_{11}$ are capable of receiving requests on communication channel twenty, and slave nodes $72_{22}$ and $72_{34}$ are capable of receiving requests on communication channel twenty-one. In this particular example, master node $70_4$ communicates a request in a multicast signal on communication channel twenty to each of slave nodes $72_1$ and $72_{11}$ and another request in a multicast signal on communication channel twenty-one to each of slave nodes $72_{22}$ and $72_{34}$.

At step 426, one or more of the slave nodes 72 that received the request package at step 424 processes the request package. For example, one or more of the slave nodes 72 that received the request package may perform the one or more activities associated with the request package. In certain embodiments, the one or more activity IDs included in the request package may direct the one or more slave nodes 72 to particular locations within an associated DLL file. The one or more slave nodes 72 may execute the relevant portions of the DLL files to perform the one or more activities requested in the request package. In this example, the activity comprises an index read, and one or more of the receiving slave nodes 72 may perform the index read to resolve at least a portion of query request 54. In certain embodiments, it may be possible for more than one of the receiving slave nodes 72 to begin processing the request package and performing the one or more activities identified in the request package. Any suitable mechanism or technique may be used to resolve this duplicative processing if desired or appropriate. An example method for reducing or eliminating the possibility that more than one slave node 72 will handle the request communicated by a master node 70 is described below with reference to FIG. 7.

In this particular example, at least one of slave nodes $72_6$ and $72_{16}$ processes the multicast signal (e.g., the request package) communicated on communication channel seventeen and determines the addresses for all persons having the first name Chad and a last name phonetically similar to Thomas. Additionally, at least one of slave nodes $72_1$ and $72_{11}$ processes the request communicated on communication channel twenty and determines the addresses for all persons having a social security number between 111-22-3333 and 111-22-3385 to master node $70_3$.

At step 428, at least one of the slave nodes 72 that processed the request package returns one or more of the results to a master node 70. In certain embodiments, slave nodes 72 may return results to the same master node 70 that communicated the request package. Slave nodes 70 may return results as a result package, which may include any suitable information, according to particular needs. Typically, a result package includes at least the transaction ID included in the request package and one or more results. In certain embodiments, slave nodes 72 may communicate all retrieved results to master nodes 70 as a single result package. In alternative embodiments, slave nodes 72 may communicate the retrieved results as multiple result packages to master nodes 70. For example, if the quantity of retrieved results exceeds a predetermined size, slave nodes 72 may communicate the retrieved results as multiple return packages to master nodes 70.

In this particular example, at least one of slave nodes $72_6$ and $72_{16}$ returns the addresses for all persons having the first name Chad and a last name phonetically similar to Thomas to master node $70_2$. In addition, at least one of slave nodes $72_2$ and $72_{16}$ processes the multicast signal communicated on communication channel eighteen and returns all persons having the first name Chad and a last name phonetically similar to Thomas to master node $70_2$. In addition, at least one of slave nodes $72_1$ and $72_{11}$ processes the request communicated on communication channel twenty and returns the addresses for all persons having a social security number between 111-22-3333 and 111-22-3385 to master node $70_3$. In addition, at least one of slave nodes $72_{22}$ and $72_{34}$ processes the request communicated on communication channel twenty-one and returns all persons having a social security number between 111-22-3386 and 111-22-3417 to master node $70_3$.

At step 430, master nodes $70_2$ and $70_3$ receive the results communicated by the respective slave nodes. The method then returns to step 408, where the master nodes 70 again read the annotated query execution graph for precompiled query $24_2$ to determine if there are any local activities to be performed. The local activities may include any suitable activities, according to particular needs. For example, the annotated query execution graph may indicate that the receiving master node 70 should perform a sort, an aggregation, a de-duplication, or any other suitable activity on the returned results.

If master nodes $70_2$ and $70_3$ determine at step 408 that one or more local activities are to be performed, master nodes $70_2$ and $70_3$ perform those activities at step 410. The method then proceeds to step 412, where master nodes $70_2$ and $70_3$ determine whether any additional remote activities should be performed. For example, depending on the annotated query execution graph for precompiled query $24_2$, an additional index read or other suitable remote activity may be needed. If it is determined that one or more additional remote activities are to be performed, master nodes $70_2$ and $70_3$ initiate performance of those additional remote activities. If master nodes $70_2$ and $70_3$ determine that no additional remote activities are to be performed, the method proceeds to step 432 where master nodes $70_2$ and $70_3$ determine whether any additional processing is to be performed. For example, the additional processing may include formatting the results of query request 54 before returning those results to the user. If additional processing is to be performed, master nodes $70_2$ and $70_3$ perform the additional processing at step 434. If no additional processing is to be performed, or once the additional processing has been performed at step 434, master nodes $70_2$ and $70_3$ may communicated the results of query request 54 to client 12. For example, master nodes $70_2$ and $70_3$ may return the results to the requesting clients 12 for display on GUI 52 of each client 12. The results may be communicated to the requesting clients 12 in a single or multiple communications, according to particular needs. The results communicated to the requesting clients 12 in any suitable format, according to particular needs, such as XML or HTML.

Although a particular method for processing a query request 54 has been described with reference to FIG. 6, the present invention contemplates any suitable method for processing a query request in accordance with the present disclosure. Thus, certain of the steps described with reference to FIG. 6 may take place simultaneously and/or in different orders than as shown. Moreover, system 10 may use methods with additional steps, fewer steps, and/or different steps, so long as the methods remain appropriate. Additionally, certain steps may be repeated as needed or desired.

Figure 7:
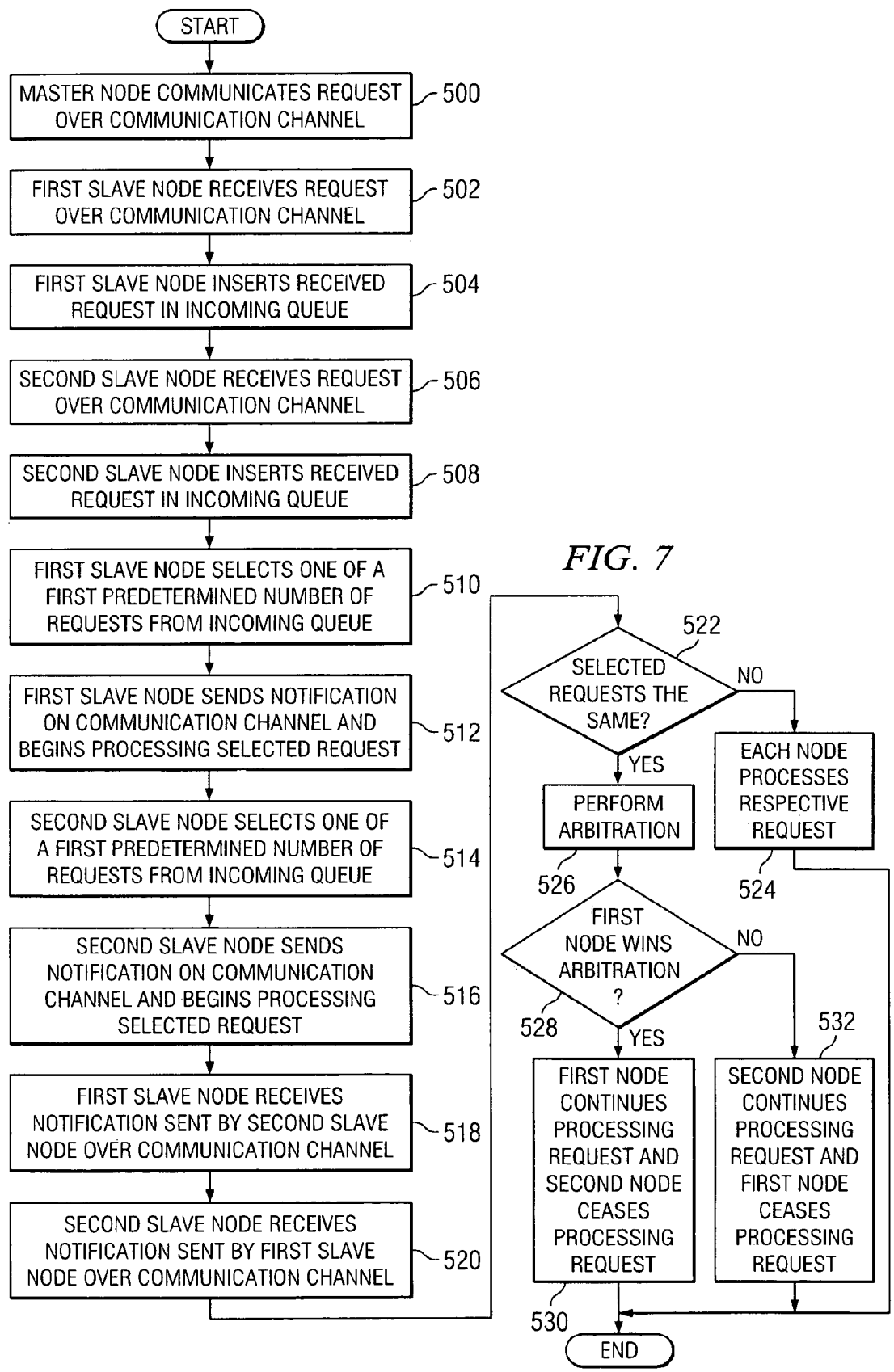
FIG. 7 illustrates an example method for processing a request to perform an activity associated with a precompiled query communicated on a communication channel by a master node and received on the communication channel by two or more slave nodes.

FIG. 7 illustrates an example method for processing a request to perform an activity associated with a precompiled query 24 communicated on a communication channel by a master node 70 and received on the communication channel by two or more slave nodes 72. In certain embodiments, the method described with reference to FIG. 7 may reduce or eliminate the possibility that more than one slave node 72 will handle the request communicated by the master node 70. Although a particular communication channel is described with reference to this example, this is for example purposes only and any suitable communication channel may be used. Additionally, although each slave node 72 is described as processing a single request at a time, in certain embodiments, each slave node may include a number of threads each operable to process requests received from master nodes 70 substantially simultaneously. Furthermore, although two slave node 72 are described for purposes of this example, any suitable number of slave nodes 72 may be operable to receive requests communicated on the communication and to perform certain steps of the method, according to particular configurations of system 14. Moreover, although the request communicated by the master node 70 is described as including a single activity, the request may include any suitable number of activities, according to particular needs.

At step 500, a master node 70 communicates on a communication channel a request to perform an activity associated with a precompiled query 24. In certain embodiments, the request may comprise a request package as described above with reference to FIG. 2. The request may be communicated as a multicast signal or in any other suitable manner over the communication channel.

At step 502, a first slave node 72 receives the request communicated by the master node 70. For example, the first slave node 72 may be registered to receive multicast communications over the communication channel. In certain embodiments, the request communicated by the master node 70 may include a request to perform and index read or other suitable activity with respect to a particular one or more key parts 70. In such embodiments, the first slave node 72 may store or otherwise have access to such one or more key parts 70. At step 504, the first slave node 72 may insert the received request in incoming queue 84 of first slave node 72. Although described as a queue, incoming queue 84 may include an suitable data structure, according to particular needs (e.g., a circular buffer).

At step 506, a second slave node 72 receives the request communicated by the master node 70. For example, the second slave node 72 may be registered to receive multicast communications over the communication channel. In certain embodiments, the request communicated by the master node 70 may include a request to perform and index read or other suitable activity with respect to a particular one or more key parts 70. In such embodiments, the second slave node 72 may store or otherwise have access to such one or more key parts 70. At step 508, the second slave node 72 may insert the received request in incoming queue 84 of second slave node 72. Although described as a queue, incoming queue 84 may include an suitable data structure, according to particular needs (e.g., a circular buffer).

In certain embodiments, steps 502 through 508 may occur at substantially the same time. Furthermore, although first and second slave nodes 72 are described, the present invention contemplates any suitable number of slave nodes 72 receiving the request communicated by the master node 70 on the communication channel. As just one example, any suitable number of slave nodes 72 may be registered to receive multicast signals communicated on the communication channel.

At step 510, the first slave node 72 selects substantially at random one of a first predetermined number of requests in its respective incoming queue 84 to handle. As a particular example, first slave node 72 may select one of the first ten requests in its incoming queue 84 for processing. This may reduce the chances that more than one slave node 72 on the same communication channel (e.g., the second slave node 72) will select the same request from their respective incoming queues 84 to process. Alternatively, the first slave node 72 may process incoming queue 84 in a standard first-in, first-out fashion or in any other suitable manner, according to particular needs. In some cases, the request received from the master node 70 may be the only request in the incoming queue 84 of the first slave node 72 (e.g., when database system 14 is less busy). Alternatively, first slave node 72 may include a number of threads each processing requests received from one or more of master nodes 70, at least one of which may not be currently busy processing a request. In such cases, the first slave node 72 may substantially immediately begin handling the request.

At step 512, the first slave node 72 may send a notification 85 over the communication channel, indicating that the first slave node 72 is handling the retrieved request, and begin processing or otherwise handling the request. The notification 85 communicated by the first slave node 72 may include any suitable information, according to particular needs. In certain embodiments, the notification 85 includes one or more of an identification of the first slave node 72, a transaction ID associated with the request, an activity ID associated with the activity in the request, or any other suitable information, according to particular needs.

At step 514, the second slave node 72 selects one of a first predetermined number of requests in its respective incoming queue 84 to handle substantially at random. As a particular example, the second slave node 72 may select one of the first ten requests in its incoming queue 84 for processing. This may reduce the chances that more than one slave node 72 on the same communication channel (e.g., the first slave node 72) will select the same request from their respective incoming queues 84 to process. Alternatively, the second slave node 72 may process incoming queue 84 in a standard first-in, first-out fashion or in any other suitable manner, according to particular needs. In some cases, the request received from the master node 70 may be the only request in the incoming queue 84 of the second slave node 72 (e.g., when database system 14 is less busy). Alternatively, second slave node 72 may include a number of threads each processing requests received from one or more of master nodes 70, at least one of which may not be currently busy processing a request. In such cases, the second slave node 72 may substantially immediately begin handling the request.

At step 516, the second slave node 72 may send a notification 85 over the communication channel, indicating that the second slave node 72 is handling the retrieved request, and begin processing or otherwise handling the request. The notification 85 communicated by the second slave node 72 may include any suitable information, according to particular needs. In certain embodiments, the notification 85 includes one or more of an identification of the second slave node 72, a transaction ID associated with the request, an activity ID associated with the activity in the request, or any other suitable information, according to particular needs.

At step 518, the first slave node 72 may receive the notification sent by the second slave node 72, indicating that the second slave node 72 is processing the request. At step 520, the second slave node 72 may receive the notification 85 communicated by first slave node 72, indicating that the second slave node 72 is processing the request.

At step 522, the first slave node 72 determines whether the notification 85 received from the second slave node 72 indicates that the second slave node 72 has selected and begun processing the same request that the first node has selected and begun processing. If the first slave node 72 determines that the second slave node 72 is not processing the same request that the first slave node 72 has already begun processing, at step 524, each of the first and second slave nodes 72 continues processing their respective selected requests.

If, at step 522, the first slave node 72 determines that the second slave node 72 is processing the same request that the first slave node 72 is processing, the first slave node 72 may initiate arbitration between the first and second slave nodes 72, at step 526, to determine which of the first and second slave nodes 72 will stop processing the request and which will continue processing the request. Although in this example the first slave node 72 is described as initiating arbitration, either or both of the first and second slave nodes 72 may initiate arbitration in this example.

In certain embodiments, for example, the arbitration may be determined based on a relative priority between the first and second slave nodes 72. The priority may be determined in any suitable manner, according to particular needs. In certain embodiments, a relative priority is assigned to each of the first and second slave nodes 72. In other embodiments, the relative priority may be based on the Internet protocol (IP) address for each of the first and second slave nodes 72, such that a slave node 72 with a higher IP address "wins" the arbitration. In yet other embodiments, the relative priority may be calculated according to an algorithm. As just one example, the algorithm may be based in part on the Internet protocol (IP address) assigned to each of the first and second slave nodes 72 and one or more other suitable variables such as the activity ID associated with an activity in the request communicated by the master node 70. The use of an algorithm may be desirable because the algorithm may reduce or eliminate the chances that the same slave node 72 always or substantially always "wins" the arbitration.

At step 528, a determination is made as to which of the first or second slave nodes 72 "won" the arbitration. If the first node "wins" the arbitration, the first slave node 72 may continue to process the request and the second slave node 72 may cease processing the request at step 530. If the first slave node 72 "loses" the arbitration at step 528, then the first slave node 72 may cease processing the request and the second slave node 72 may continue processing the request at step 532.

Although a particular method for performing an activity associated with a precompiled query 24 has been described with reference to FIG. 7, the present invention contemplates any suitable method for performing an activity associated with a precompiled query in accordance with the present disclosure. Thus, certain of the steps described with reference to FIG. 7 may take place simultaneously and/or in different orders than as shown. Moreover, system 10 may use methods with additional steps, fewer steps, and/or different steps, so long as the methods remain appropriate. Additionally, certain steps may be repeated as needed or desired.

Figures 8, 9:
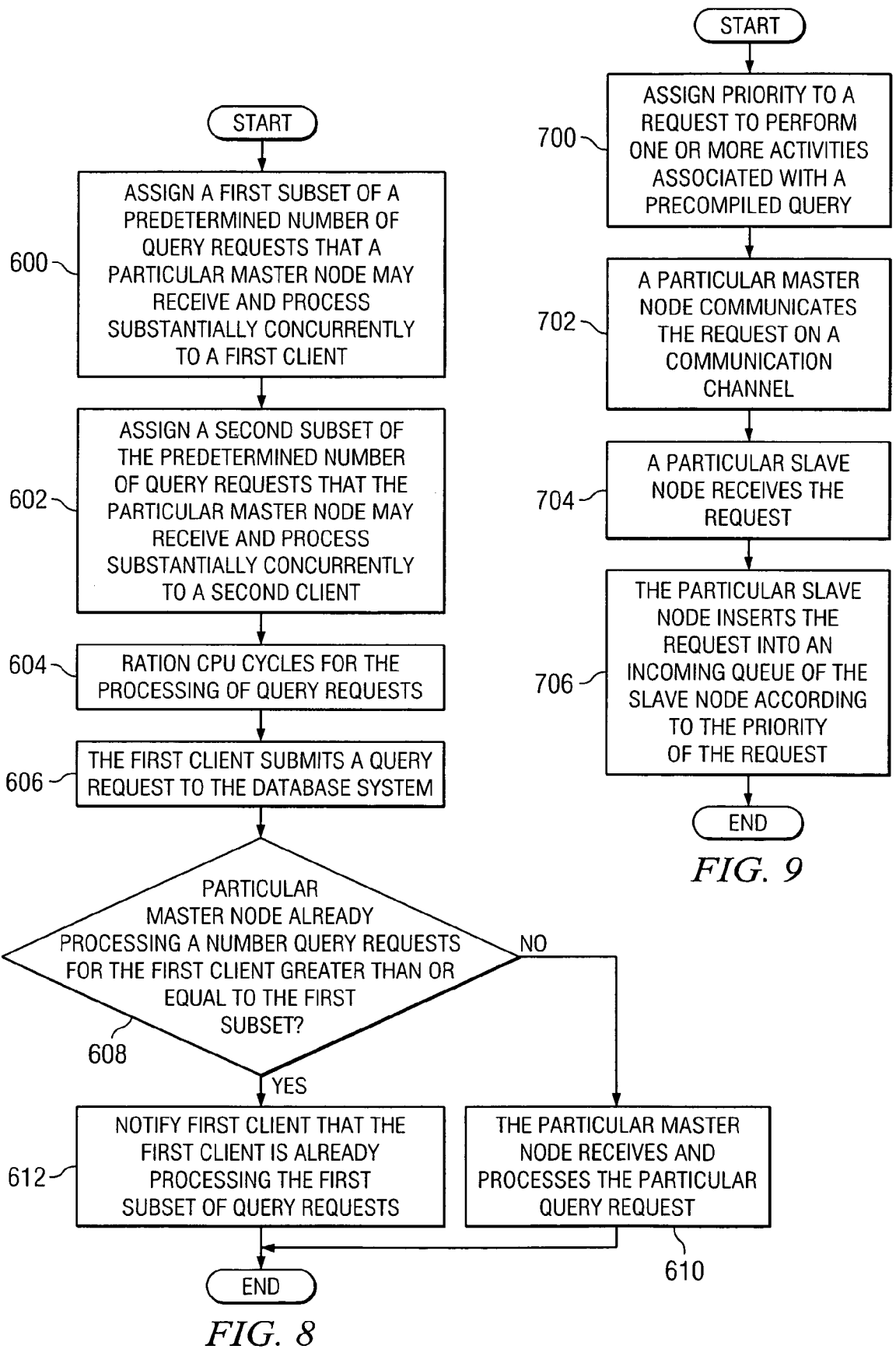
FIG. 8 illustrates an example method for managing the receipt and processing of query requests at one or more master nodes of the database system.
FIG. 9 illustrates an example method for processing requests to perform one or more activities associated with a precompiled query that are communicated by a particular master node according to priorities assigned to the requests.

FIG. 8 illustrates an example method for managing the receipt and processing of query requests 54 at one or more master nodes 70 of the database system. In certain embodiments, the method described with reference to FIG. 8 may help system 14 to manage throughput in processing of query requests 54 received from one or more clients 12. Although particular master nodes 70 are described with reference to FIG. 8, any or all of the master nodes 70 of system 14 may be capable of performing the method without departing from the scope of the present invention. Additionally, although two clients 12 are described as being associated with a particular master node 70, the present invention contemplates any suitable number of clients 12 being associated with the particular master node 70. Furthermore, it will be assumed, for purposes of this example, that each master node 70 of system 14 is operable to receive and process a predetermined number of query requests 54 substantially concurrently. For example, each master node 70 may include a particular number of threads, each operable to receive and process a different query request 54 substantially concurrently.

At step 600, a first subset of the predetermined number of query requests 54 that a particular master node 70 may receive and process substantially concurrently may be assigned to a first client 12. The first subset may be defined as a number of query requests 54 that the particular master node 70 may process for the first client 12 at substantially the same time. For example, the particular master node 70 may include a particular number of threads (e.g., thirty), each operable to receive and process a different query request 54 substantially concurrently. A predetermined number of those threads may be assigned to the first client 12 for receiving and processing query requests 54 received from the first client 12. In this example, twenty of the predetermined number of query requests 54 are assigned to first client 12 as the first subset.

At step 602, a second subset of the predetermined number of query requests 54 that the particular master node 70 may receive and process substantially concurrently may be assigned to a second client 12. The second subset may be defined as a number of query requests 54 that the particular master node 70 may process for the second client 12 at substantially the same time. For example, the particular master node 70 may include a particular number of threads (e.g., thirty), each operable to receive and process a different query request 54 substantially concurrently. A predetermined number of those threads may be assigned to the second client 12 for receiving and processing query requests 54 received from the second client 12. In this example, ten of the predetermined number of query requests 54 are assigned to first client 12 as the second subset. Although first subset and second subset are described as being twenty and ten for purposes of this example, the first and second subsets may have any suitable size, according to particular needs.

At step 604, a suitable component of system 14 or the particular master node 70 may ration CPU cycles for the processing of query requests 54 received by the particular master node 70 from first and second clients 12, according to each of the first and second client 12s' use of their respectively assigned subsets. For example, if the first client 12 is currently using all threads assigned to the first client 12 and the second client 12 is currently using none of the threads assigned to the second client 12, then all CPU cycles may be dedicated to processing the query requests received by the first client 12, until such time as the second client 12 begins submitting query requests 54. In certain embodiments, it may be possible to ration CPU cycles at intermediate levels of use by first and second clients 12. For example, if the first client 12 is currently using fifteen of the twenty threads assigned to the first client 12 and the second client 12 is currently using five of the threads assigned to the second client 12, the CPU cycles that would ordinarily be give to the currently idle threads (ten total idle threads in this example) may instead be divided in any suitable manner between the threads being used by the first and second clients 12.

At step 606, the first client 12 submits a particular query request 54 to system 14. At step 608, a determination is made whether the particular master node 70 is already processing a number of query requests 54 for the first client 12 that is greater than or equal to the first subset of query requests 54 assigned to the first client 12. In certain embodiments, query receiving module 60 may make this determination based on data received by communicating with the particular master node 70. If it is determined at step 608 that the particular master node 70 is currently processing less than the first subset of query requests 54 assigned to the first client 12, then at step 610, the particular master node 70 may receive and process the particular query request 54 submitted by the first client 12. For example, if one or more of the twenty threads of the particular master node 70 that are assigned to the first client 12 are not currently processing query requests 54 for the first client 12 (and are not otherwise occupied), then at least one of the available threads may receive and process the query request 54 submitted by the first client 12.

If it is determined at step 608 that the particular master node 70 is currently processing a number of query requests 54 that is greater than or equal to the first subset of query requests 54 assigned to the first client 12, then at step 612, the particular master node 70 may notify the first client 12 that there are no available threads. For example the particular master node 70 may prompt the first client 12 to select another master node 70 or to resubmit the particular query request at a later time. Alternatively, the particular master node 70 or query receiving module 60 may automatically determine whether another master node 70 has an available thread for processing the particular query request 54 and may prompt the first client 12 to connect to the determined other master node 70 that has an available thread (or may automatically connect the first client 12 to the determined other master node 70). Additionally or alternatively, query receiving module 60 may automatically attempt to resubmit the particular query request 54 to the particular master node 70.

Although a particular method for managing the receipt and processing of query requests by one or more master nodes 70 of database system 14 has been described with reference to FIG. 8, the present invention contemplates any suitable method for managing the receipt and processing of query requests by one or more master nodes 70 of database system 14 in accordance with the present disclosure. Thus, certain of the steps described with reference to FIG. 8 may take place simultaneously and/or in different orders than as shown. As just one example, it may be determined whether one or more other master nodes 70 may receive and process the particular query request 54 received from the first client 12 prior to determining whether the second client 12 is already tying up the remaining availability of the particular master node 70. Moreover, system 10 may use methods with additional steps, fewer steps, and/or different steps, so long as the methods remain appropriate. Additionally, certain steps may be repeated as needed or desired.

FIG. 9 illustrates an example method for processing requests to perform one or more activities associated with a precompiled query 24 that are communicated by a particular master node 70 according to priorities assigned to the requests. In certain embodiments, the method described with reference to FIG. 9 may help system 14 to manage throughput in processing of query requests 54 received from one or more clients 12. Although particular numbers of master nodes 70 and slave nodes 72 are described with reference to FIG. 9, any or all of master nodes 70 and slave nodes 72 of system 14 may be capable of performing the method without departing from the scope of the present invention.

At step 700, a priority is assigned to a request to perform one or more activities associated with a precompiled query 24. The priority may include a high priority, a medium priority, a low priority, or any other suitable priority, according to particular needs. In some examples, the request may comprise a request package, as described above with reference to FIG. 2, and the priority may be identified by a priority identifier in the request package. In certain embodiments, the priority identifier may be a binary value for which zero represents a low priority and one represents a high priority, or vice versa.

The priority may be a user-specified priority in query request 54. Additionally or alternatively, the priority may be based on an identification of the client 12 that submitted the query request 54 associated with the request package. For example, certain clients 12 may be granted or assigned a higher priority than other clients 12, so that query requests 54 submitted by those clients 12 granted a higher priority tend to be processed more quickly by system 14 than query requests 54 submitted by those clients 12 granted a lower priority. Additionally or alternatively, the priority may be based on the type of query request 54 and/or the type of activities associated with the request package.

At step 702, a particular master node 70 may communicate the request on a communication channel, which may be determined as described above at least with reference to FIG. 2. At step 704, a particular slave node 72 receives the request communicated by the particular master node 70. At step 706, the particular slave node 72 may insert the request into an incoming queue 84 of the particular slave node 72, according to the priority associated with the request. For example, the particular slave node 72 may inspect the priority identifier in the request package, and if the priority identifier indicates that the request package has a high priority, then the slave node 72 may insert the request package at the head or substantially at the head of its incoming queue 84.

Additionally or alternatively, the particular slave node 72 may maintain separate incoming queues 84, one incoming queue 84 being for high priority requests and one incoming queue 84 being for low priority requests. In certain embodiments, the particular slave node 72 may select a request for processing from its high priority incoming queue 84 before or more frequently than it selects a request for processing from its low priority incoming queue 84. Although two incoming queues 84 are described (one for high priority requests and one for low priority requests), the present invention contemplates the particular slave node 72 maintaining a number of incoming queues 84, each corresponding to one of a number of degrees of priority (e.g., high priority, medium priority, and low priority). Prioritizing requests received from master nodes 70 may enable may help system 14 to manage throughput in processing of query requests 54 received from one or more clients 12. In particular embodiments, prioritizing requests may help system 14 to increase or maximize throughput for query requests 54 of higher importance or priority.

Although a particular method for processing requests to perform one or more activities associated with a precompiled query 24 that are communicated by a particular master node 70 according to priorities assigned to the requests has been described with reference to FIG. 9, the present invention contemplates any suitable method for processing requests to perform one or more activities in accordance with the present disclosure. Thus, certain of the steps described with reference to FIG. 9 may take place simultaneously and/or in different orders than as shown. Moreover, system 10 may use methods with additional steps, fewer steps, and/or different steps, so long as the methods remain appropriate. Additionally, certain steps may be repeated as needed or desired.

Figure 10:
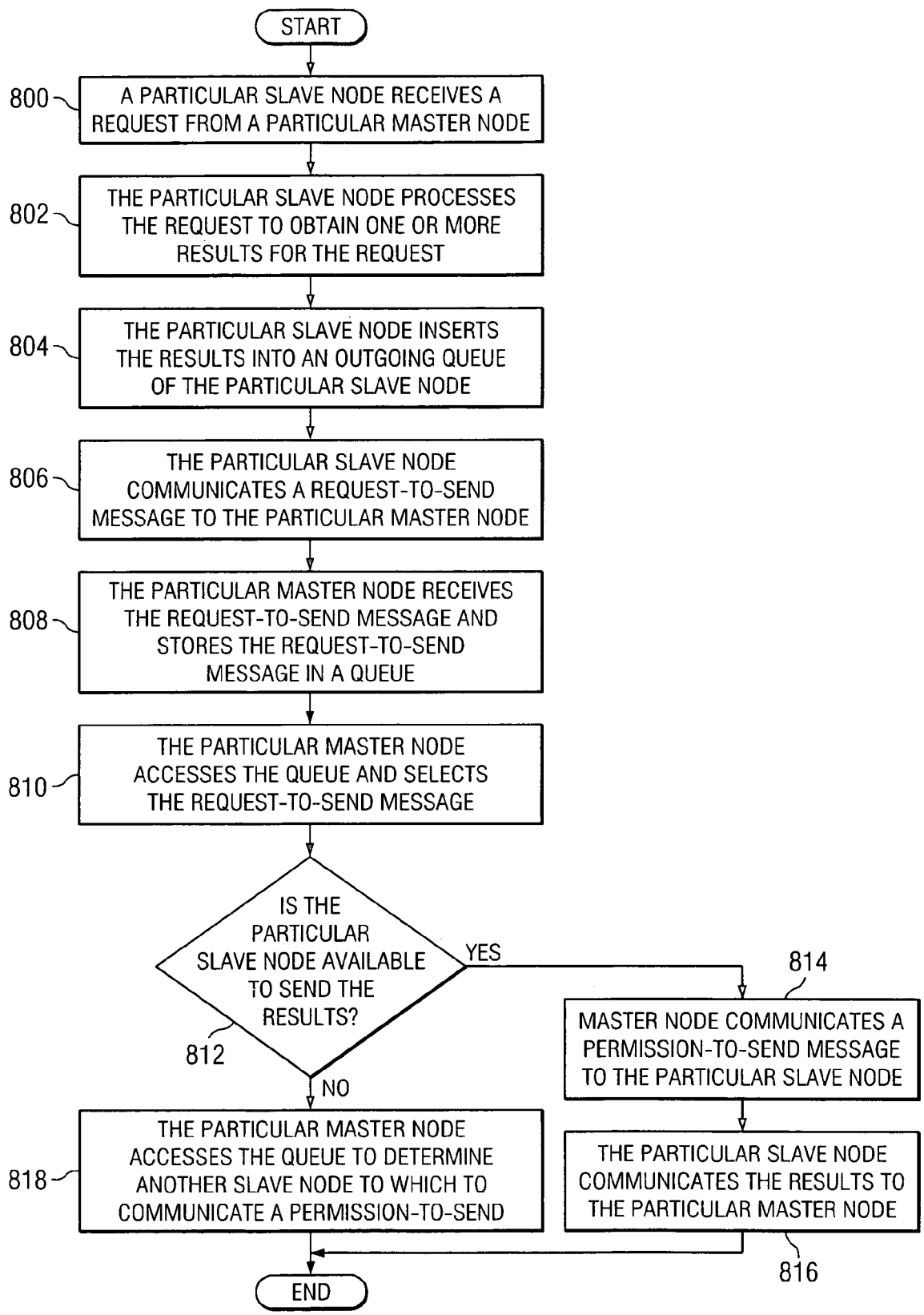
FIG. 10 illustrates an example method for returning results of a request to perform one or more activities associated with a precompiled query communicated by a master node from one or more slave nodes to the master node.

FIG. 10 illustrates an example method for returning results of a request to perform one or more activities associated with a precompiled query communicated by a master node 70 from one or more slave nodes 72 to the master node 72. Although a particular master node 70 and a particular slave node 72 are described as performing certain steps of the method, any or all of master nodes 70 and slave nodes 72 may be capable of performing substantially similar steps. It should also be understood that each master node 70 of system 14 may be processing multiple query requests on multiple threads of the master node 70, and may have communicated requests to perform one or more activities associated with one or more precompiled queries 54 to one or more slave nodes 72 of system 14. Thus, each slave node 72 may have related or unrelated results for multiple master nodes 70 (or multiple related or unrelated results for a single master node 70), and each master node 70 may have multiple requests for which the master node 70 is awaiting results from one or more slave nodes 72.

At step 800, a particular slave node 72 receives from a particular master node 70 a request to perform one or more activities associated with a precompiled query 24. For example, the request may be a request to perform an index read of one or more key parts 30 accessible to the particular slave node 72. In certain embodiments, the request may comprise a request package, as described above with reference to FIG. 2. The request may have been communicated by the particular master node 70 over a communication channel, as a multicast message for example. In certain embodiments, a substantially similar request may be received by multiple slave nodes 72 on the same or a different communication channel.

At step 802, the particular slave node 72 processes the request by performing at least a portion of the one or more activities of the request to obtain one or more results for the request. For example, if the request is a request to perform an index read of one or more key parts 30 accessible to the particular slave node 72, the slave node may access the one or more key parts 30 to obtain results according to one or more parameters included in the request.

At step 804, the particular slave node 72 may insert the results into an outgoing queue 86 of the particular slave node 72. The outgoing queue 86 may include results obtained by the particular slave node 72 for one or more master nodes 70. For example, the particular slave node 72 may have processed requests received from a number of master nodes 70, and the results obtained for each of those requests may be stored in outgoing queue 86. Alternatively, the particular slave node 72 may maintain separate outgoing queues 86 for each master node 70 or store results in any other suitable manner.

At step 806, the particular slave node 72 may communicate a request-to-send message to the particular master node 70. In certain embodiments, the request-to-send message may include an identification of the particular master node 70, a transaction ID associated with the request package to which the results obtained by the particular slave node 72 correspond, time stamp information, or any other suitable information according to particular needs. The request-to-send message may be communicated to the particular master node 70 over a dedicated flow-control channel. In embodiments in which the particular slave node 72 has obtained results for multiple requests for multiple master nodes 70, the particular slave node 72 may have sent multiple request-to-send messages to multiple master nodes 70, and the particular slave node 72 may be waiting for a permission-to-send message from one of the master nodes 70 (including the particular master node 70) before sending any results.

At step 808, the particular master node 70 receives the request-to-send message and stores it in queue 87. At step 810, the particular master node 70 accesses queue 87 and selects the request-to-send message sent by the particular slave node 72. It should be appreciated that the particular master node 70 may have processed other request-to-send messages in queue 87 between steps 808 and 810.

At step 812, the particular master node 70 determines whether the particular slave node 72 is available to send the results. In certain embodiments, the particular master node 70 determines whether the particular slave node 72 is currently busy sending results to another master node 70 based on information communicated over the flow-control channel. The particular master node 70 (as well as all master nodes 70) may be listening on the flow-control channel for messages indicating which slave nodes 72 are currently busy sending results to one or more master nodes 70.

If the particular master node 70 determines at step 812 that the particular slave node 72 is available to send the results, then at step 814, master node 70 may communicate a permission-to-send message to the particular slave node 72, granting the particular slave node 72 permission to send the results. As described above, the permission-to-send message may be associated with a predefined time limit, after which the permission is no longer valid. If that time limit expires, the request-to-send message for which the permission-to-send message was communicated may be reinserted in queue 87.

At step 816, in response to the permission-to-send message, the particular slave node 72 may communicate the results to the particular master node 70, as described above with reference to FIG. 2. In certain embodiments, the results may comprise a result package, which may include a transaction ID (e.g., at a high-level layer of the transport mechanism). Inclusion of the transaction ID may allow the particular master node 70 to match the results with the request that the master communicated to the particular slave node 72, and/or with other result packages for the request.

If, at step 812, the particular master node 70 determines that the particular slave node 72 is not available to send the results, then at step 818, the particular master node 70 may access queue 87 for another request-to-send message to process. The particular master node 70 may attempt to find a slave node 72, from which the particular master node 70 has received a request-to-send message, that is not currently busy sending results to another master node 70. Alternatively, if the particular master node 72 has not received any other request-to-send messages, then the particular master node 70 may wait until it receives another request to send or determines that the particular slave node 72 is available to send a permission-to-send message.

Although a particular method for returning results of a request to perform one or more activities associated with a precompiled query communicated by a master node 70 from one or more slave nodes 72 to the master node 72 has been described with reference to FIG. 10, the present invention contemplates any suitable method for returning results in accordance with the present disclosure. Thus, certain of the steps described with reference to FIG. 10 may take place simultaneously and/or in different orders than as shown. Moreover, system 10 may use methods with additional steps, fewer steps, and/or different steps, so long as the methods remain appropriate. Additionally, certain steps may be repeated as needed or desired.

Although the present invention has been described with several embodiments, diverse changes, substitutions, variations, alterations, and modifications may be suggested to one skilled in the art, and it is intended that the invention encompass all such changes, substitutions, variations, alterations, and modifications as fall within the spirit and scope of the appended claims.

What is claimed is:

1. A database system for processing a query request, comprising:
    at least one master node operable to:
        store a precompiled query that is capable of resolving a query request received by the database system, each precompiled query being a query that has been deployed on the database system in advance of a user executing such query on the database system;
        receive a query request comprising one or more parameters used by the precompiled query to resolve the query request;

communicate a request to a slave node to perform one or more activities associated with the precompiled query and one or more top level keys associated with the precompiled query, the one or more top level keys identifying the location of a key part within the database system; and a plurality of slave nodes coupled to the at least one master node, each of the plurality of slave nodes operable to store one or more key parts each comprising stored data, an address associated with the stored data, and an identifier for identifying the location of additional data that satisfies at least a portion of the precompiled query, wherein the stored data is sorted according to combinations of the one or more parameters used by the precompiled query to resolve the query request, at least one of the plurality of slave nodes operable to:

receive the request communicated by the at least one master node; and process the request communicated by the at least one master node.

2. The system of claim 1, wherein the precompiled query is operable to resolve routine or standard data requests that are capable of having variations in input parameters.

3. The system of claim 1, wherein the precompiled query is operable to resolve routine or standard data requests that are capable of having variations in intermediate results of the precompiled query.

4. The system of claim 1, wherein:
the precompiled query comprises an annotated query execution graph and one or more executables; and
the at least one master node is operable to read the annotated query execution graph to determine the one or more activities associated with the precompiled query to communicate.

5. The system of claim 1, wherein:
the at least one master node is operable to access at least one of the top level keys to identify a communication channel that communicates with one or more of the plurality of slave nodes that store a particular key part.

6. The system of claim 5, wherein the at least one master node is operable to communicate the request to perform the one or more activities associated with the precompiled query on the identified communication channel, the request comprising one or more of the parameters of the query request.

7. The system of claim 6, wherein:
one or more of the plurality of slave nodes are each operable to receive the request communicated by the master node on the communication channel; and
at least one of the one or more slave nodes is operable to process the request communicated by the master node by performing the one or more activities of the request.

8. The system of claim 7, wherein:
at least one of the one or more activities comprises an index read of one or more key parts; and
the slave node performs the at least one activity by retrieving appropriate data in the one or more key parts for resolving at least a portion of the query request based at least on the one or more parameters of the request.

9. The system of claim 7, wherein the at least one slave node is operable to perform the one or more activities by executing appropriate portions of one or more executable files operable to perform the one or more activities.

10. The system of claim 1, wherein at least one of the plurality of slave nodes is operable to return one or more results to the at least one master node after processing at least a portion of the request communicated by the at least one master node.

11. The system of claim 10, wherein the at least one master node is operable to perform one or more local activities in response to receiving the one or more results.

12. The system of claim 11, wherein the one or more local activities comprise one or more of:
a sort of at least a portion of the returned results;
a de-duplication of at least a portion of the returned results; and
a roll-up of at least a portion of the returned results.

13. The system of claim 1, wherein each of the one or more key parts comprises a portion of a sorted data file.

14. The system of claim 1, wherein at least some of the one or more key parts are stored on at least some of the plurality of slave nodes in advance of a user requesting data from such key parts.

15. The system of claim 1, further comprising a plurality of master nodes, each of the plurality of master nodes operable to store the precompiled query and one or more top level keys associated with the precompiled query.

16. The system of claim 1, wherein each of the plurality of slave nodes is operable to store the precompiled query.

17. The system of claim 1, wherein the precompiled query is stored on the at least one master node in advance of a user providing the query request to the database system.

18. A method for processing a query request on a database system, the database system comprising one or more master nodes and a plurality of slave nodes coupled to the one or more master nodes, the method comprising:

receiving a query request comprising one or more parameters used by a precompiled query to resolve the query request, the precompiled query being stored on at least one master node of the database system and operable to resolve a query request received by the database system, each precompiled query being a query that has been deployed on the database system in advance of a user executing such query on the database system;

communicating from the at least one master node a request to a slave node to perform one or more activities associated with the precompiled query and one or more top level keys associated with the precompiled query, the one or more top level keys identifying the location of a key part within the database system;

receiving the request to perform one or more activities at one or more of the plurality of slave nodes, each of the plurality of slave nodes operable to store one or more key parts each comprising stored data, an address associated with the stored data, and an identifier for identifying the location of additional data that satisfies at least a portion of the precompiled query, wherein the stored data is sorted according to combinations of the one or more parameters used by the precompiled query to resolve the query request; and processing the request communicated by the at least one master node at the one or more slave nodes.

19. The method of claim 18, wherein the precompiled query is operable to resolve routine or standard data requests that are capable of having variations in input parameters.

20. The method of claim 18, wherein:
the precompiled query comprises an annotated query execution graph and one or more executables; and
the method comprises reading the annotated query execution graph to determine the one or more activities associated with the precompiled query to communicate.

21. The method of claim 18, wherein:
the method further comprises accessing at least one of the top level keys to identify a communication channel that communicates with the one or more slave nodes that store a particular key part.

22. The method of claim 21, comprising communicating the request to perform the one or more activities associated with the precompiled query on the identified communication channel, the request comprising one or more of the parameters of the query request.

23. The method of claim 22, comprising:
receiving the request communicated by the master node on the communication channel at the one or more slave nodes; and
processing the request communicated by the master node on at least one of the one or more slave nodes by performing the one or more activities of the request.

24. The method of claim 23, wherein:
at least one of the one or more activities comprises an index read of one or more key parts; and
the method comprises performing the at least one activity at the at least one slave node by retrieving appropriate data in the one or more key parts for resolving at least a portion of the query request based at least on the one or more parameters of the request.

25. The method of claim 23, comprising performing the one or more activities at the at least one slave node by executing appropriate portions of one or more executable files operable to perform the one or more activities.

26. The method of claim 18, wherein at least one of the plurality of slave nodes is operable to return one or more results to the at least one master node after processing at least a portion of the request communicated by the at least one master node.

27. The method of claim 26, further comprising performing one or more local activities at the at least one master node in response to receiving the one or more results.

28. The method of claim 18, comprising:
storing at least some of the one or more key parts on at least some of the plurality of slave nodes in advance of a user requesting data from such key parts; and
storing, on each of the plurality of slave nodes, the precompiled query in advance of the user requesting data from such key parts.

29. The method of claim 18, comprising storing, on the at least one master node, the precompiled query in advance of a user providing the query request to the database system.

30. A computer-readable storage medium, storing program instructions for performing, when executed by a processor, a method for processing a query request on a database system, wherein the database system comprises one or more master nodes and a plurality of slave nodes coupled to the one or more master nodes, the method comprising:
receiving a query request comprising one or more parameters used by a precompiled query to resolve the query request, the precompiled query being stored on at least one master node of the database system and operable to resolve a query request received by the database system, each precompiled query being a query that has been deployed on the database system in advance of a user executing such query on the database system;
communicating from the at least one master node a request to a slave node to perform one or more activities associated with the precompiled query and one or more top level keys associated with the precompiled query, the one or more top level key identifying the location of a key part within the database system;
receiving the request to perform one or more activities at one or more of the plurality of slave nodes, each of the plurality of slave nodes operable to store one or more key parts each comprising stored data, an address associated with the stored data, and an identifier for identifying the location of additional data that satisfies at least a portion of the precompiled query, wherein the stored data is sorted according to combinations of the one or more parameters used by the precompiled query to resolve the query request; and
processing the request communicated by the at least one master node at the one or more slave nodes.

* * * * *